United States Patent
Chen et al.

(10) Patent No.: US 9,813,736 B2
(45) Date of Patent: Nov. 7, 2017

(54) INTER-VIEW DEPENDENCY TYPE IN MV-HEVC

(71) Applicant: QUALCOMM Incorporated, San Diego, CA (US)

(72) Inventors: Ying Chen, San Diego, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 430 days.

(21) Appl. No.: 14/496,807

(22) Filed: Sep. 25, 2014

(65) Prior Publication Data

US 2015/0092837 A1 Apr. 2, 2015

Related U.S. Application Data

(60) Provisional application No. 61/883,931, filed on Sep. 27, 2013.

(51) Int. Cl.
*H04N 19/30* (2014.01)
*H04N 19/70* (2014.01)
*H04N 19/597* (2014.01)
*H04N 19/463* (2014.01)

(52) U.S. Cl.
CPC ........... *H04N 19/597* (2014.11); *H04N 19/30* (2014.11); *H04N 19/463* (2014.11); *H04N 19/70* (2014.11)

(58) Field of Classification Search
CPC .... H04N 19/30; H04N 19/463; H04N 19/597; H04N 19/70
See application file for complete search history.

(56) References Cited

U.S. PATENT DOCUMENTS

| | | | | |
|---|---|---|---|---|
| 2011/0216833 A1* | 9/2011 | Chen | .................. | H04N 13/0022 375/240.16 |
| 2013/0114680 A1* | 5/2013 | Leontaris | ........... | H04N 13/0029 375/240.02 |
| 2013/0188733 A1 | 7/2013 | Van et al. | | |
| 2014/0177718 A1* | 6/2014 | Rusert | .............. | H04N 19/00769 375/240.16 |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.

(Continued)

*Primary Examiner* — Md Haque
(74) *Attorney, Agent, or Firm* — Shumaker & Sieffert, P.A.

(57) ABSTRACT

A video decoder receives a value for a first syntax element representing whether a dependency type syntax element for a current layer is signaled, wherein the dependency type syntax element identifies a type of dependency of a current layer relative to a reference layer; and in response to the value for the first syntax element indicating that the dependency type syntax element is not signaled determines that the type of dependency of the current layer relative to the reference layer is a predetermined type and decodes a block of the current layer using inter-layer prediction conforming to the predetermined type.

29 Claims, 8 Drawing Sheets

(56) References Cited

OTHER PUBLICATIONS

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.

Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.

Bross et al., "WD4: Working Draft 4 of High-Efficiency Video Coding," 6th Meeting: Torino, IT, Jul. 14 through 22, 2011, (Joint Collaborative Team on Video Coding of ISO/IEC JTC1/SC29/WG11 and ITU-T SG.16); JCTVC-F803_d2, Oct. 4, 2011, 226 pp.

Bross et al., "WD5: Working Draft 5 of High-Efficiency Video Coding," 7th Meeting: Geneva, Switzerland, Nov. 21 through 30, 2011, (Joint Collaborative Team on Video Coding of ISO/IEC JTC1/SC29/WG11 and ITU-T SG.16);JCTVC-G1103_d2, Dec. 30, 2011, 214 pp.

Bross et al., "High efficiency video coding (HEVC) text specification draft 6," 8th Meeting: San Jose, CA, USA, Feb. 1 through 10, 2012, (Joint Collaborative Team on Video Coding of ISO/IEC JTC1/SC29/WG11 and ITU-T SG.16); JCTVC-H1003, Apr. 2, 2012, 259 pp.

Bross et al., "High efficiency video coding (HEVC) text specification draft 7," 9th Meeting: Geneva, CH, Apr. 27 through May 7, 2012, (Joint Collaborative Team on Video Coding of ISO/IEC JTC1/SC29/WG11 and ITU-T SG.16); JCTVC-I1003_d2, Jun. 1, 2012, 290 pp.

Bross et al., "High efficiency video coding (HEVC) text specification draft 8," 10th Meeting: Stockholm, SE, Jul. 11 through 20, 2012, (Joint Collaborative Team on Video Coding of ISO/IEC JTC1/SC29/WG11 and ITU-T SG.16); JCTVC-J1003_d7, Jul. 28, 2012, 261 pp.

Bross et al., "High efficiency video coding (HEVC) text specification draft 9," 11th Meeting: Shanghai, CN, Oct. 10 through 19, 2012, (Joint Collaborative Team on Video Coding of ISO/IEC JTC1/SC29/WG11 and ITU-T SG.16); JCTVC-K1003_v7, Nov. 2, 2012, 290 pp.

Bross et al., "High efficiency video coding (HEVC) text specification draft 10 (for FDIS & Last Call)," 12th Meeting: Geneva, CH, Jan. 14 through 23, 2013, (Joint Collaborative Team on Video Coding of ISO/IEC JTC1/SC29/WG11 and ITU-T SG.16); JCTVC-L1003_v34, Mar. 19, 2013, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Chen, et al., "Description of Scalable Video coding Technology Proposal by Qualcomm (Configuration 2)", JCT-VC Meeting; MPEG Meeting Oct. 19, 2012; Shanghai; (Joint Collaborative Team on Video Coding of ISO/IEC JTC1/SC29/WG11 and ITU-T SG.16); <URL: http://wftp3.itu.int/av-arch/jctvc-site/no.jvtcv-k0036>, Oct. 2, 2012, XP030112968, 22 pp.

Chen, et al., "SHVC Working Draft 2," JCT-VC Meeting; MPEG Meeting Apr. 18-26, 2013; Shanghai; (Joint Collaborative Team on Video Coding of ISO/IEC JTC1/SC29/WG11 and ITU-T SG.16); JCTVC-M1008_v3, Jun. 14, 2013, 67 pp.

Tech G., et al., "MV-HEVC Draft Text 5", Joint Collaborative Team on 3D Video Coding Extension Development of ITU-T SG 16 WP 3 and ISO/IEC JTC 1/SC 29/WG 11, Jul. 27-Aug. 2, 2013; Doc: JCT3V-E1004-v6, 5th Meeting: Vienna, AT, Aug. 7, 2013, 65 pp.

Tech, et al., "3D-HEVC Draft Text 1", JCT-3V Meeting; MPEG Meeting; Jul. 27-Aug. 2, 2013; (The Joint Collaborative Team on 3D Video Coding Extension Development of ISO/IEC JTC1/SC29/WG11 and ITU-T SG.16); No. JCT3V-E1001_v3, Sep. 11, 2013; XP030130664, 89 pp.

International Search Report and Written Opinion from International Application No. PCT/US2014/057719, dated Jan. 19, 2015, 11 pp.

Response to Written Opinion dated Jan. 19, 2015, from International Application No. PCT/US2014/057719, filed on Jul. 24, 2015, 5 pp.

Second Written Opinion from International Application No. PCT/US2014/057719, dated Sep. 15, 2015, 7 pp.

Second Written Opinion from International Application No. PCT/US2014/057719, dated Dec. 15, 2015, 10 pp.

Response to Second Written Opinion dated Sep. 15, 2015, from International Application No. PCT/US2014/057719, filed on Nov. 16, 2015, 20 pp.

International Preliminary Report on Patentability from International Application No. PCT/US2014/057719, dated Jan. 28, 2016, 11 pp.

Tech, et al., "MV-HEVC Draft Text 4," MPEG Meeting; Apr. 20-26, 2013; (The Joint Collaborative Team on 3D Video Coding Extension Development of ISO/IEC JTC1/SC29/WG11 and ITU-T SG.16); Document: JCT3V-D1004_d0, Apr. 13, 2013; 53 pp.

* cited by examiner

INTER-VIEW DEPENDENCY TYPE IN MV-HEVC

This application claims the benefit of U.S. Provisional Application No. 61/883,931, filed 27 Sep. 2013, which is hereby incorporated by reference its entirety.

TECHNICAL FIELD

This disclosure relates to video coding and, more particularly, to signaling of inter-view dependency type in multi-layer coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

According to the techniques of this disclosure, signaling overhead associated with signaling inter-layer dependency types for layer combinations of multi-layer video data may be reduced by including, in a bitstream of video data, a syntax element representing whether a dependency type syntax element for each layer combination is signaled. In response to the value for the first syntax element indicating that the dependency type syntax element is not signaled, a video decoder determines that the type of dependency for all layer combinations is a predetermined type and decodes a block of the current layer using inter-layer prediction conforming to the predetermined type.

In one example, a method of decoding multi-layer video data includes receiving a value for a first syntax element representing whether a dependency type syntax element for a current layer is signaled, wherein the dependency type syntax element identifies a type of dependency of a current layer relative to a reference layer; and in response to the value for the first syntax element indicating that the dependency type syntax element is not signaled determining that the type of dependency of the current layer relative to the reference layer is a predetermined type and decoding a block of the current layer using inter-layer prediction conforming to the predetermined type.

In another example, a method of encoding multi-layer video data includes, for coded video data comprising multiple layers, determining whether to encode the multiple layers using a same dependency type for all layers of the multiples layers or multiple dependency types, wherein a dependency type identifies a type of dependency of a current layer relative to a reference layer; and based on determining whether to encode the multiple layers using the same dependency type or multiple dependency types, determining a value for a first syntax element representing whether a dependency type syntax element for a current layer is signaled.

In another example, an apparatus that performs video coding includes a memory storing video data and a video coder comprising one or more processors configured to: receive a value for a first syntax element representing whether a dependency type syntax element for a current layer is signaled, wherein the dependency type syntax element identifies a type of dependency of a current layer relative to a reference layer; and, in response to the value for the first syntax element indicating that the dependency type syntax element is not signaled determine that the type of dependency of the current layer relative to the reference layer is a predetermined type and decode a block of the current layer using inter-layer prediction conforming to the predetermined type.

In another example, a computer-readable storage medium storing instructions that when executed by one or more processors cause the one or more processors to receive a value for a first syntax element representing whether a dependency type syntax element for a current layer is signaled, wherein the dependency type syntax element identifies a type of dependency of a current layer relative to a reference layer; in response to the value for the first syntax element indicating that the dependency type syntax element is not signaled determine that the type of dependency of the current layer relative to the reference layer is a predetermined type and decode a block of the current layer using inter-layer prediction conforming to the predetermined type.

An apparatus for decoding multi-layer video data, that includes means for receiving a value for a first syntax element representing whether a dependency type syntax element for a current layer is signaled, wherein the dependency type syntax element identifies a type of dependency of a current layer relative to a reference layer; means for determining that the type of dependency of the current layer relative to the reference layer is a predetermined type in response to the value for the first syntax element indicating that the dependency type syntax element is not signaled; and means for decoding a block of the current layer using inter-layer prediction conforming to the predetermined type.

An apparatus for coding video data comprising, for coded video data comprising multiple layers, means for determining whether to encode the multiple layers using a same dependency type for all layers of the multiples layers or multiple dependency types, wherein a dependency type identifies a type of dependency of a current layer relative to a reference layer; and based on determining whether to encode the multiple layers using the same dependency type or multiple dependency types, means for determining a value for a first syntax element representing whether a dependency type syntax element for a current layer is signaled.

The details of one or more examples are set forth in the accompanying drawings and the description below. Other features, objects, and advantages will be apparent from the description and drawings, and from the claims.

DETAILED DESCRIPTION

Figure 1:
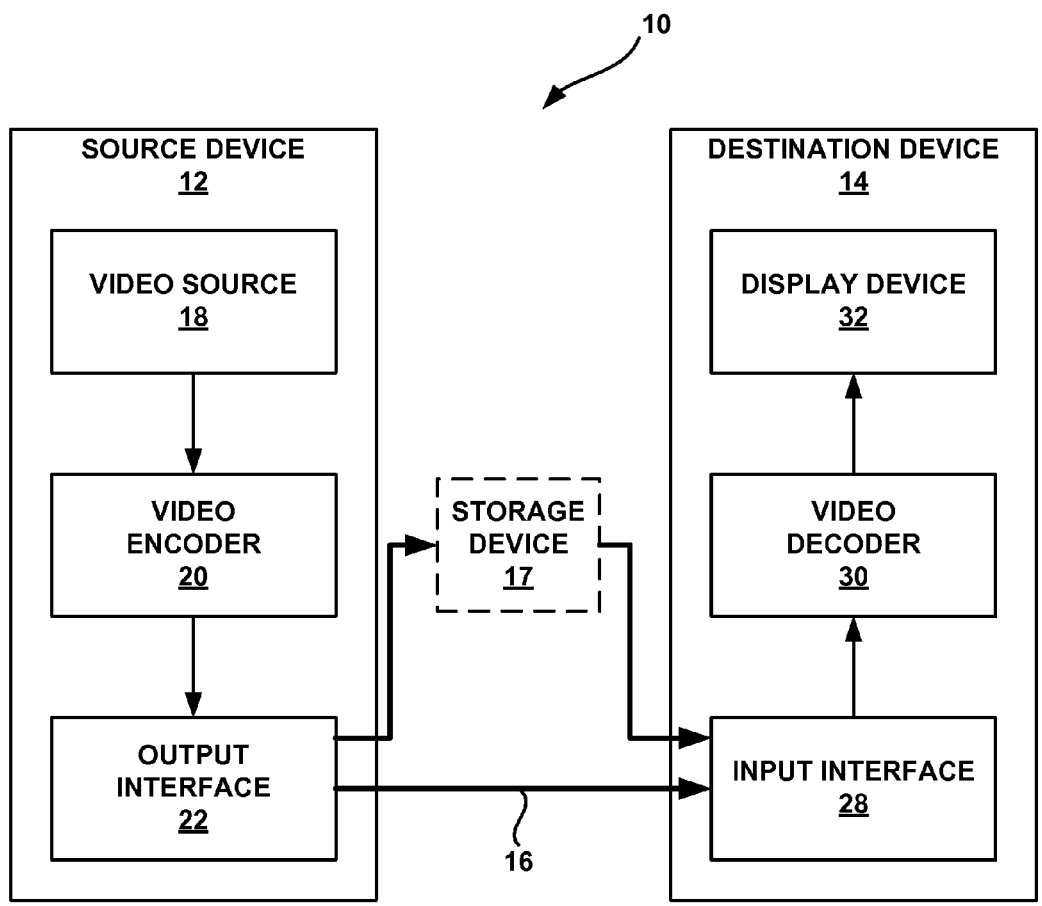
FIG. 1 is a block diagram illustrating an example video encoding and decoding system that may utilize the techniques described in this disclosure.

This disclosure introduces techniques related to the signaling of inter-layer dependency type in multi-layer video coding, such as in the emerging Multi-View, High Efficiency Video Coding (MV-HEVC) standard. In the High Efficiency Video Coding (HEVC) standard, a layer generally refers to the set of video coding layer (VCL), network abstraction layer (NAL) units that all have (i.e., each share) a particular layer identification value (e.g., the "nuh_layer_id" value in HEVC, where "nuh" refers to the "NAL unit header") and the non-VCL NAL units associated with the layer. A layer may, for example, correspond to a view when coding multiview video data or various scalable dimensions (e.g., spatial resolution, PSNR, color bit depth, or other such dimensions) for scalable video coding. Each layer of a video stream is associated with a layer identification value. Thus, different layers are associated with different layer identification values.

Inter-layer prediction generally refers to prediction (e.g., predicting a video block from an already coded video block) that is dependent on data elements, such as sample values or motion information, of reference pictures in a different layer than that of the layer (e.g., a current layer) associated with the block being predicted. A current layer may have a specific inter-layer dependency type relative to a reference layer. The inter-layer dependency type defines the manner in which the current layer may depend on the reference layer. Examples of inter-layer dependency types include inter-layer sample prediction, inter-layer motion prediction, and a combination of inter-layer sample prediction and inter-layer motion prediction. When inter-layer sample prediction is enabled, a video coder may predict a current block of video data based on a block in a reference picture of a different layer (i.e., a reference layer). The video coder may identify the block in the different layer using, for example, a disparity motion vector. The disparity motion vector may, for example, be determined for the current block based on the motion information of spatial or temporal neighboring blocks of the current block, which are blocks in the same layer as the current block.

When inter-layer motion prediction is enabled, a video coder may predict motion information for a current block based on motion information of a block in a different layer. The motion information may, for example, include a motion vector (e.g., a disparity motion vector or a temporal motion vector), and in some instances, the motion information may also include additional information, such as a reference picture index. Using the motion information of the block in the other layer (i.e., a layer other than the layer associated with the current block), the video coder may determine motion information for the current block and, based on the determined motion information, may identify a predictive block in a reference picture of the same layer as the current block. When a combination of inter-layer sample prediction and inter-layer motion prediction is enabled, a video coder may perform both inter-layer sample prediction and inter-layer motion prediction.

According to some implementations of signaling inter-layer dependency types, a video coder codes a syntax element (e.g., the "direct_dependency_type" syntax element in HEVC) for every combination of layers in the bitstream to identify an inter-layer dependency type for the combination. With each instance of the syntax element being two or more bits, the signaling of inter-layer dependency types may produce an undesirable signaling overhead, particularly for bitstreams with a large number of layers. According to the techniques of this disclosure, one of inter-layer motion prediction or inter-layer sample prediction may be disabled, thus reducing or eliminating the instances in which the video coder needs to signal an inter-layer dependency type. A video encoder may signal to a video decoder that a particular type of inter-layer prediction has been disabled.

Disabling one of inter-layer sample prediction and inter-layer motion prediction may be functionally equivalent to enabling one of inter-layer sample prediction and inter-layer motion prediction. For example, with three inter-layer dependency types (e.g. inter-layer sample prediction only, inter-layer motion prediction only, and the combination of inter-layer sample and inter-layer motion prediction), if the video decoder disables inter-layer sample prediction, then the video decoder disables both inter-layer sample prediction only and the combination of inter-layer sample and inter-layer motion prediction, thereby enabling only inter-layer motion prediction. Similarly, if the video decoder disables inter-layer motion prediction, then the video coder enables inter-layer sample prediction.

According to one example of the techniques of this disclosure, a video decoder may receive a value for a first syntax element (e.g., "direct_dep_type_len_minus2" syntax element discussed in detail below) representing (i.e., indicative of) whether a second syntax element (i.e. a dependency type syntax element) for a current layer is signaled. The dependency type syntax element may identify a type of dependency of a current layer relative to a reference layer. In response to the value for the first syntax element indicating that the dependency type syntax element is not signaled, the video decoder may determine that the type of dependency of the current layer relative to the reference layer is a predetermined type and decode a block of the current layer using inter-layer prediction conforming to the predetermined type.

In some implementations the predetermined type may be configured into (e.g., stored locally in memory) the video encoder and decoder, for example, as part of a video codec. In such a configuration, the first syntax element may be a single bit, where a first value (e.g. a value of "0" or a value of "1") for the first syntax element indicates the inter-layer dependency type for all layers is the pre-determined type. Thus, in response to receiving a first value for the first syntax element, the video decoder may determine, without receiving an instance of the second syntax element, that the inter-layer dependency type for all layer combinations of a video bitstream is the predetermined inter-layer dependency type defined by (or locally stored at) the video codec. A second value (e.g. a value of "1" or a value of "0") for the first syntax element may indicate inter-layer dependency types will be signaled separately for each layer combination. Thus, in response to receiving a second value for the first syntax element, the video decoder may determine inter-layer dependency types for combinations of layers by receiving (i.e., based on receipt) an instance of the second syntax element for each layer combination.

In other implementations the predetermined type may be signaled from the video encoder to the video decoder, for example, as part of the first syntax element. In such a configuration, the first syntax element may be a multi-bit syntax element, where a first value for the first syntax element indicates the inter-layer dependency type for all layer combinations is inter-layer sample prediction and a second value for the first syntax element indicates the inter-layer dependency type for all layer combinations is inter-layer motion prediction. Thus, in response to receiving the first value or the second value for the first syntax element, the video decoder may determine, without receiving an instance of the second syntax element, that the inter-layer dependency type for all layer combinations of a video bitstream is the predetermined inter-layer dependency indicated by the first syntax element. A third value for the first syntax element may indicate inter-layer dependency types will be signaled separately for each layer combination. Thus, in response to receiving the third value for the first syntax element, the video decoder may determine inter-layer dependency types for combinations of layers by receiving (based on receipt) an instance of the second syntax element for each layer combination.

According to the techniques of this disclosure, when either inter-layer motion prediction or inter-layer sample prediction is disabled, a video decoder may be configured to determine, without any additional signaling (e.g. without receiving instances of the second syntax element described above), an inter-layer dependency type for the combinations of layers. For example, if inter-layer motion prediction is disabled, then the video decoder may be configured to determine, without additional signaling for a layer combination, that an inter-layer dependency type for the layer combination is inter-layer sample prediction. Whereas existing techniques may always code multiple instances of the second syntax element (i.e. the dependency type syntax element), the techniques of this disclosure may, in some coding scenarios, only code one (i.e., a single) instance of the first syntax element and avoid (i.e., refrain from and/or not be required to) coding multiple instances of the second syntax element. By reducing or eliminating the need to signal an inter-layer dependency type (e.g. the second syntax element described above) for some layer combinations, the techniques of this disclosure may, in some coding scenarios, reduce signaling overhead associated with signaling inter-layer dependency types.

As used in this disclosure, the term current block is generally meant to refer to a block currently being coded, as opposed to an already coded block or a yet to be coded block. As used in this disclosure, the term coding may be generically used to refer to either video encoding or video decoding.

FIG. 1 is a block diagram illustrating an example video encoding and decoding system 10 that may utilize the inter-layer dependency type signaling techniques described in this disclosure. As shown in FIG. 1, system 10 includes a source device 12 that generates encoded video data, including multi-layer video data, to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 17. Similarly, encoded data may be accessed from storage device 17 by input interface. Storage device 17 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 17 may correspond to a file server or another intermediate storage device that may hold the encoded video generated by source device 12. Destination device 14 may access stored video data from storage device 17 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a wireless local area network (WLAN) connection), a wired connection (e.g., DSL, cable modem, etc.), or a combination of both that is suitable for accessing encoded video data stored on a file server. The transmission of encoded video data from storage device 17 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 17 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 17, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multi-view Video Coding (MVC) extension, and MVC-based 3DV extension. In some instances, any bitstream conforming to the MVC-based 3DV extension of H.264/AVC always contains a sub-bitstream that is compliant to the MVC extension of H.264/AVC. Furthermore, there is an ongoing effort to generate a three-dimensional video (3DV) coding extension to H.264/AVC, namely AVC-based 3DV. In other examples, video encoder 20 and video decoder 30 may operate according to ITU-T H.261, ISO/IEC MPEG-1 Visual, ITU-T H.262 or ISO/IEC MPEG-2 Visual, and ITU-T H.264, ISO/IEC Visual.

Recently, the design of a new video coding standard, namely High-Efficiency Video Coding (HEVC), has been finalized by the Joint Collaboration Team on Video Coding (JCT-VC) of ITU-T Video Coding Experts Group (VCEG) and ISO/IEC Motion Picture Experts Group (MPEG). Video encoder 20 and video decoder 30 may operate according to the HEVC standard.

Furthermore, there are ongoing efforts to produce scalable video coding, multi-view coding, and 3DV extensions for HEVC. Two extensions of HEVC supporting 3D services have been under development by the Joint Collaboration Team on 3D Video coding (JCT-3V) of ITU-T VCEG and ISO/IEC MPEG and are referred to as MV-HEVC and 3D-HEVC, respectively. 3D-HEVC codes multiview video plus depth format and includes new coding tools in addition to the HEVC coding modules. The newly introduced coding tools are applicable for both texture coding and depth coding. MV-HEVC refers to the multi-view coding extension of HEVC, which supports the coding of multiple (texture) views without changing the block level design of HEVC. A recent Working Draft (WD) of MV-HEVC WD4 hereinafter, is hereby incorporate by reference and is available, as of 25 Sep. 2014 at http://phenix.it-sudparis.eu/jct2/doc_end_user/documents/4_Incheon/wg11/JCT3V-D1004-v1.zip.

The scalable video coding extension of HEVC may be referred to as SHEVC. A recent Working Draft (WD) of SHEVC and referred to as SHEVC WD2 hereinafter, is hereby incorporate by reference and is available, as of 25 Sep. 2014 at http://phenix.int-evry.fr/jct/doc_end_user/documents/13_Incheon/wg11/JCTVC-M1008-v1.zip. Video encoder 20 and video decoder 30 may operate according to any of SHEVC, MV-HEVC, and/or 3D-HEVC.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

As introduced above, the JCT-VC recently finalized development of the HEVC standard. The HEVC standardization efforts were based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

As will be described in more detail below, as part of inter-mode coding, video encoder 20 may determine whether to use the same dependency type for all layers of multi-layer video data or to use multiple dependency types. Video encoder 20 may then signal or omit signaling accordingly based on the dependency type used. Video decoder 30 is configured with, or potentially receives via signaling, a predetermined type, such that if the dependency type is not signaled, video decoder 30 may simply apply the predetermined type.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

As introduced above, this disclosure discusses techniques related to the signaling of inter-layer dependency type in multi-layer video coding, including MV-HEVC. The techniques described in this disclosure may also potentially apply to other multi-layer extensions of HEVC, such as SHEVC, or other codecs. As introduced above, MVC is an extension of H.264/AVC. Aspects of the MVC specification will now be briefly discussed in order to provide context and background for future discussions.

Figure 2:
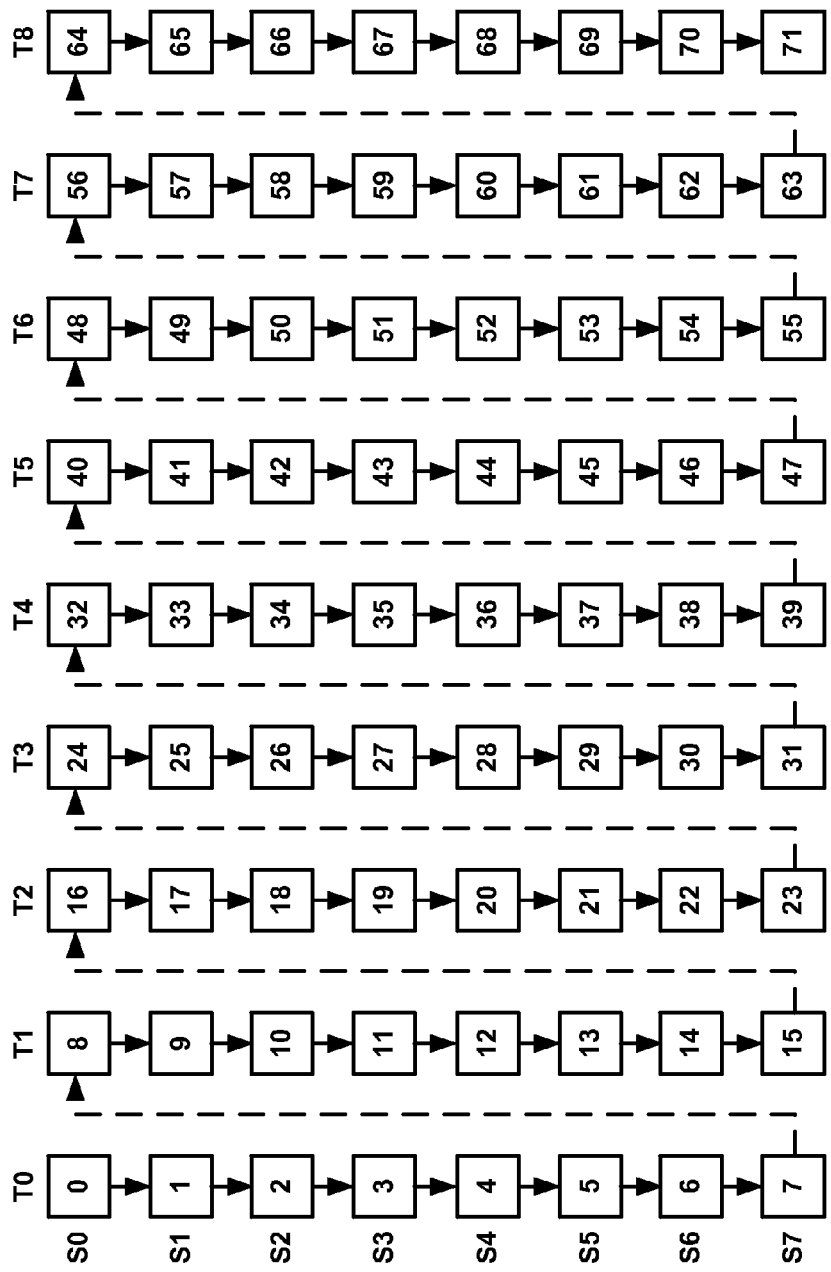
FIG. 2 is a graphical diagram illustrating an example multiview encoding or decoding order, in accordance with one or more examples described in this disclosure.

FIG. 2 is a graphical diagram illustrating an example MVC encoding or decoding order, in accordance with one or more examples described in this disclosure. For example, the decoding order arrangement illustrated in FIG. 2 is referred to as time-first coding. In FIG. 2, S0-S7 each refers to different views of the multiview video. T0-T8 each represents one output time instance. An access unit may include the coded pictures of all the views for one output time instance. For example, a first access unit includes all of the views S0-S7 for time instance T0 (i.e., pictures 0-7), a second access unit includes all of the views S0-S7 for time instance T1 (i.e., pictures 8-15), and so forth. In this examples, pictures 0-7 are at a same time instance (i.e., time instance T0), pictures 8-15 at a same time instance (i.e., time instance T1). Pictures with the same time instance are generally displayed at the same time, and the horizontal disparity, and possibly some vertical disparity, between the objects within the pictures of the same time instance causes the viewer to perceive an image that encompasses a 3D volume.

A typical MVC decoding order (i.e., bitstream order) is shown in FIG. 2. The decoding order arrangement is referred as time-first coding. Each access unit is defined to contain the coded pictures of all the views for one output time instance. Note that the decoding order of access units may not be identical to the output or display order.

Figure 3:
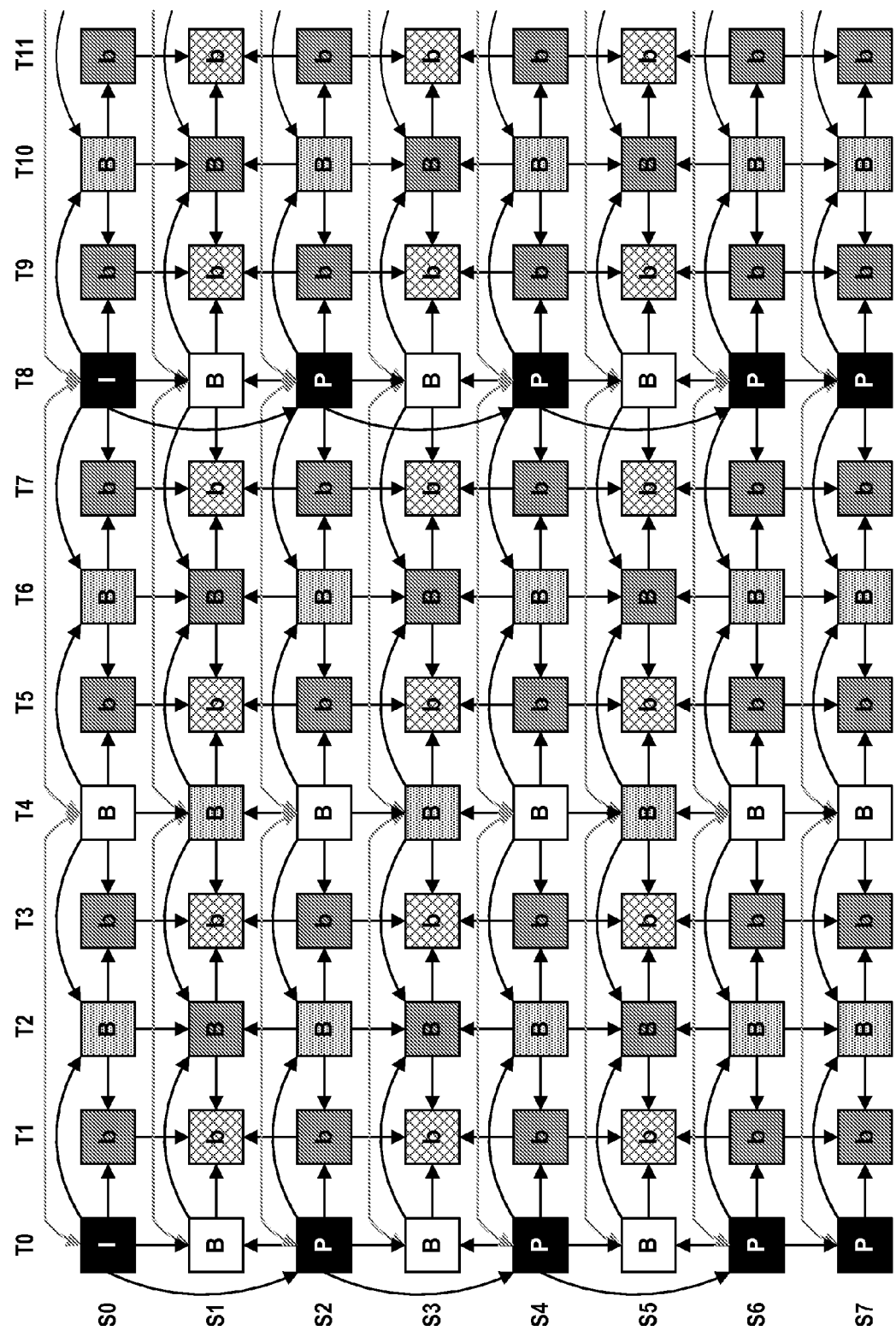
FIG. 3 shows an example MVC temporal and inter-view prediction structure.

FIG. 3 is a conceptual diagram illustrating an example Multiview Video Coding (MVC) prediction pattern. In the example of FIG. 3, eight views are illustrated, and twelve temporal locations are illustrated for each view. In general, each row in FIG. 3 corresponds to a view, while each column indicates a temporal location. Each of the views may be identified using a view identifier ("view_id"), which may be used to indicate a relative camera location with respect to the other views. In the example shown in FIG. 3, the view IDs are indicated as "S0" through "S7," although numeric view IDs may also be used. In addition, each of the temporal locations may be identified using a picture order count (POC) value, which indicates a display order of the pictures. In the example shown in FIG. 3, the POC values are indicated as "T0" through "T11."

Pictures in FIG. 3 are indicated using a shaded block including a letter, designating whether the corresponding picture is intra-coded (that is, an I-frame), or inter-coded in one direction (that is, as a P-frame) or in multiple directions (that is, as a B-frame). In general, predictions are indicated by arrows, where the pointed-to picture uses the point-from object for prediction reference. For example, the P-frame of view S2 at temporal location T0 is predicted from the I-frame of view S0 at temporal location T0. Each of the pictures shown in FIG. 3 may be referred to as a view component.

As with single view video encoding, pictures of a multi-view video sequence may be predictively encoded with respect to pictures at different temporal locations. For example, the b-frame of view S0 at temporal location T1 has an arrow pointed to it from the I-frame of view S0 at temporal location T0, indicating that the b-frame is predicted from the I-frame. Additionally, however, in the context of multiview video encoding, pictures may be inter-view predicted. That is, a view component can use the view components in other views for reference. In MVC, for example, inter-view prediction is realized as if the view component in another view is an inter-prediction reference. The potential inter-view references may be signaled in the SPS MVC extension and may be modified by the reference picture list construction process, which enables flexible ordering of the inter-prediction or inter-view prediction references.

FIG. 3 provides various examples of inter-view prediction. Pictures of view S1, in the example of FIG. 3, are illustrated as being predicted from pictures at different temporal locations of view S1, as well as inter-view predicted from pictures of pictures of views S0 and S2 at the same temporal locations. For example, the b-frame of view S1 at temporal location T1 is predicted from each of the B-frames of view S1 at temporal locations T0 and T2, as well as the b-frames of views S0 and S2 at temporal location T1.

In the example of FIG. 3, capital "B" and lowercase "b" are intended to indicate different hierarchical relationships between pictures, rather than different encoding methodologies. In general, capital "B" frames are relatively higher in the prediction hierarchy than lowercase "b" frames. FIG. 3 also illustrates variations in the prediction hierarchy using different levels of shading, where a greater amount of shading (that is, relatively darker) pictures are higher in the prediction hierarchy than those pictures having less shading (that is, relatively lighter). For example, all I-frames in FIG. 3 are illustrated with full shading, while P-frames have a somewhat lighter shading, and B-frames (and lowercase b-frames) have various levels of shading relative to each other, but always lighter than the shading of the P-frames and the I-frames.

In general, the prediction hierarchy is related to view order indexes, in that pictures relatively higher in the prediction hierarchy should be decoded before decoding pictures that are relatively lower in the hierarchy, such that those pictures relatively higher in the hierarchy can be used as reference pictures during decoding of the pictures relatively lower in the hierarchy. A view order index is an index that indicates the decoding order of view components in an access unit. The view order indices may be implied in a parameter set, such as an SPS.

In this manner, pictures used as reference pictures may be decoded before decoding the pictures that are encoded with reference to the reference pictures. A view order index is an index that indicates the decoding order of view components in an access unit. According to MVC/AVC, for each view order index i, the corresponding view_id is signaled. The decoding of the view components follows the ascending order of the view order indexes. If all the views are presented, then the set of view order indexes comprises a consecutively ordered set from zero to one less than the full number of views.

In some instances, a subset of a whole bitstream can be extracted to form a sub-bitstream which still conforms to MVC. There are many possible sub-bitstreams that specific applications may require, based on, for example, a service provided by a server, the capacity, support, and capabilities of decoders of one or more clients, and/or the preference of one or more clients. For example, a client might require only three views, and there might be two scenarios. In one example, one client may require a smooth viewing experience and might prefer views with view_id values S0, S1, and S2, while another other client may require view scalability and prefer views with view_id values S0, S2, and S4. Both of these sub-bitstreams can be decoded as independent MVC bitstreams and can be supported simultaneously.

While FIG. 3 shows eight views (S0-S7), as noted above, the MVC/AVC extension supports up to 1024 views and uses a view_id in a NAL unit header to identify the view to which a NAL unit belongs. A view order index may be signaled as part of a NAL unit header. That is, for purposes of comparison, a view order index may replace the view_id that is signaled in the NAL unit header of the MVC/AVC extension. View order generally describes the ordering of the views in an access unit, and a view order index identifies a particular view in view order of the access unit. That is, a view order index describes the decoding order of a corresponding view component of an access unit.

Accordingly, an SPS may provide a relationship between view_ids for the views and view order indexes for the views. Using the view order index and the data in the SPS, video encoder 20 and video decoder 30 may replace the 10 bit view_id of MVC/AVC in the NAL unit header by the view order index, which may lead to a bit savings over the MVC/AVC scheme.

A typical MVC prediction (including both inter-picture prediction within each view and inter-view prediction) structure for multi-view video coding is shown in FIG. 3. The predictions are indicated by arrows. In the example of FIG. 3, the pointed-to object uses the pointed-from object for prediction reference.

In MVC, the inter-view prediction is supported by disparity motion compensation, which uses the syntax of the H.264/AVC motion compensation, but allows a picture in a different view to be used as a reference picture. The coding of two views may also be supported by MVC. One of the potential advantages of MVC is that an MVC encoder can take more than two views as a 3D video input, and an MVC decoder can decode such a multiview representation. So any renderer with an MVC decoder may expect 3D video contents with more than two views.

Aspects of MVC inter-view prediction will now be described. In MVC, inter-view prediction is allowed among pictures in the same access unit (i.e., with the same time instance). When coding a picture in one of the non-base views, a picture may be added into a reference picture list if the picture is in a different view but with a same time instance. An inter-view prediction reference picture can be put in any position of a reference picture list, just like any inter prediction reference picture.

Aspects of the sequence parameter set (SPS) for the MVC Extension will now be described. As shown in FIG. 3, a view component can use the view components in other views for reference, which is referred to as inter-view prediction. In MVC, inter-view prediction is realized as if the view component in another view was an inter prediction reference. The potential inter-view references, however, are signaled in the SPS MVC extension (as shown in TABLE 1 below) and can be modified by a reference picture list construction process implemented by a video coder, which enables flexible ordering of the inter prediction or inter-view prediction references.

TABLE 1

|  | Descriptor |
|---|---|
| seq_parameter_set_mvc_extension( ) { | |
|    num_views_minus1 | ue(v) |
|    for( i = 0; i <= num_views_minus1; i++ ) | |
|      view_id[ i ] | ue(v) |
|    for( i = 1; i <= num_views_minus1; i++ ) { | |
|      num_anchor_refs_l0[ i ] | ue(v) |
|      for( j = 0; j < num_anchor_refs_l0[ i ]; j++ ) | |
|        anchor_ref_l0[ i ][ j ] | ue(v) |
|      num_anchor_refs_l1[ i ] | ue(v) |
|      for( j = 0; j < num_anchor_refs_l1[ i ]; j++ ) | |
|        anchor_ref_l1[ i ][ j ] | ue(v) |
|    } | |
|    for( i = 1; i <= num_views_minus1; i++ ) { | |
|      num_non_anchor_refs_l0[ i ] | ue(v) |
|      for( j = 0; j < num_non_anchor_refs_l0[ i ]; j++ ) | |
|        non_anchor_ref_l0[ i ][ j ] | ue(v) |
|      num_non_anchor_refs_l1[ i ] | ue(v) |
|      for( j = 0; j < num_non_anchor_refs_l1[ i ]; j++ ) | |
|        non_anchor_ref_l1[ i ][ j ] | ue(v) |
|    } | |
|    num_level_values_signalled_minus1 | ue(v) |
|    for( i = 0; i <= num_level_values_signalled_minus1; i++) { | |
|      level_idc[ i ] | u(8) |
|      num_applicable_ops_minus1[ i ] | ue(v) |
|      for( j = 0; j <= num_applicable_ops_minus1[ i ]; j++ ) { | |
|        applicable_op_temporal_id[ i ][ j ] | u(3) |
|        applicable_op_num_target_views_minus1[ i ][ j ] | ue(v) |
|        for( k = 0; k <= applicable_op_num_target_views_minus1[ i ][ j ]; k++ ) | |
|          applicable_op_target_view_id[ i ][ j ][ k ] | ue(v) |
|        applicable_op_num_views_minus1[ i ][ j ] | ue(v) |
|      } | |
|    } | |
| } | |

In the SPS MVC extension shown above in TABLE 1, for each view, the number of views that can be used to form reference picture list 0 and reference picture list 1 are signaled.

Prediction relationship for an anchor picture, as signaled in the SPS MVC extension can be different from the prediction relationship for a non-anchor picture (signaled in the SPS MVC extension) of the same view. In H.264, an anchor picture is a coded picture in which all slices may reference only slices within the same access unit. In other words, inter-view prediction may be used for an anchor picture, but no inter prediction (i.e., temporal prediction) is used for an anchor picture. H.264 defines a non-anchor picture as a picture that is not an anchor picture.

Aspects of dependency type in MV-HEVC will now be discussed. In MV-HEVC, inter-layer dependency type is signaled in a way that at least three types are supported. The three types are inter-layer sample prediction (as in MVC), inter-layer motion prediction, and the combination of both.

As shown below, in the Video Parameter Set (VPS) extension of the MV-HEVC, the syntax element "direct_dep_type_len_minus2" specifies how many inter-layer prediction types are supported, while the syntax element "direct_dependency_type[i][j]" specifies the exact inter-layer prediction type. More specifically, the syntax element "direct_dependency_type[i][j]" identifies the type of dependency layer [i] has with respect to layer [j].

A portion of MV-HEVC WD5 related to VPS semantics is reproduced below.

TABLE 2

Video parameter set extension syntax

|  | Descriptor |
|---|---|
| vps_extension( ) { | |
|   while( !byte_aligned( ) ) | |
|     vps_extension_byte_alignment_reserved_one_bit | u(1) |
|   avc_base_layer_flag | u(1) |
|   splitting_flag | u(1) |
|   for( i = 0, NumScalabilityTypes = 0; i < 16; i++ ) { | |
|     scalability_mask[ i ] | u(1) |
|     NumScalabilityTypes += scalability_mask[ i ] | |
|   } | |
| ... | |
|   num_output_layer_sets | ue(v) |
|   for( i = 0; i < num_output_layer_sets; i++ ) { | |
|     output_layer_set_idx_minus1[ i ] | ue(v) |
|     lsIdx = output_layer_set_idx_minus1[ i ] + 1 | |
|     for( j = 0 ; j <= vps_max_layer_id; j++) | |
|       if( layer_id_included_flag[ lsIdx ][ j ] ) | |
|         output_layer_flag[ lsIdx ][ j ] | u(1) |
|   } | |
| ... | |
|   direct_dep_type_len_minus2 | ue(v) |
|   for( i = 1; i <= vps_max_layers_minus1; i++ ) | |
|     for( j = 0; j < i; j++ ) | |
|       if( direct_dependency_flag[ i ][ j ] ) | |
|         direct_dependency_type[ i ][ j ] | u(v) |
| } | | direct_dep_type_len_minus2 plus 2 specifies the number of bits of the direct_dependency_type[i][j] syntax element. In bitstreams conforming to this version of this Specification the value of direct_dep_type_len_minus2 shall be equal 0. Although the value of direct_dep_type_len_minus2 shall be equal to 0 in this version of this Specification, decoders shall allow other values of direct_dep_type_len_minus2 in the range of 0 to 30, inclusive, to appear in the syntax.

direct_dependency_type[i][j] indicates the type of dependency between the layer with nuh_layer_id equal layer_id_in_nuh[i] and the layer with nuh_layer_id equal to layer_id_in_nuh[j]. direct_dependency_type[i][j] equal to 0 indicates that the layer with nuh_layer_id equal to layer_id_in_nuh[j] is used for both inter-layer sample prediction and inter-layer motion prediction of the layer with nuh_layer_id equal layer_id_in_nuh[i]. direct_dependency_type[i][j] equal to 1 indicates that the layer with nuh_layer_id equal to layer_id_in_nuh[j] is used for inter-layer sample prediction but not for inter-layer motion prediction of the layer with nuh_layer_id equal layer_id_in_nuh[i]. direct_dependency_type[i][j] equal to 2 indicates that the layer with nuh_layer_id equal to layer_id_in_nuh[j] is used for inter-layer motion prediction but not for inter-layer sample prediction of the layer with nuh_layer_id equal layer_id_in_nuh[i]. Although the value of direct_dependency_type[i][j] shall be in the range of 0 to 2, inclusive, in this version of this Specification, decoders shall allow values of direct_dependency_type[i][j] in the range of 3 to $2^{32}-2$, inclusive, to appear in the syntax.

When coding certain types of multi-layer video, the performance of video encoder 20 and video decoder 30 may not be enhanced, or may only be minimally enhanced, by certain types of inter-layer prediction, meaning the specific type of inter-layer prediction does not produce a desirable rate-distortion trade off. As one example, in some instances, MV-HEVC coded video may not benefit, or only minimally benefit, from inter-layer motion prediction. According to the techniques of this disclosure, video encoder 20 may make a determination that inter-layer motion prediction should be disabled and that one type of inter-layer prediction may be assumed by video decoder 30. Even if a video encoder were to make such a determination, according to existing signaling techniques, the video encoder may still need to signal a syntax element identifying a dependency type (e.g., "direct_dependency_type") for each combination of layers in a bitstream, with each occurrence of the dependency type syntax element costing at least two bits. Existing MV-HEVC techniques include no mechanism to avoid this signaling of the "direct_dependency_type" syntax element even though the syntax element may not be useful if, for example, inter-layer motion prediction is disabled.

This disclosure introduces techniques for modifying the signaling of a dependency type for a current layer relative to a reference layer. In MV-HEVC, for example, the "direct_dep_type_len_minus2" syntax element may be modified to allow for the number of dependency types to be equal to 0, indicating that a dependency type syntax element will not be signaled. When the dependency type syntax element is not signaled, video decoder 30 may determine that the type of dependency of a current layer relative to a reference layer is a predetermined type and therefore proceed to decode a block of the current layer using inter-layer prediction conforming to the predetermined type. As discussed above, the predetermined type may be defined in the video codec or may be signaled as part of the first syntax element (e.g. direct_dep_type_len_minus2).

If implementing the techniques of this disclosure in conjunction with MV-HEVC, for example, the signaling of the "direct_dependency_type" syntax element may be avoided depending on the value of direct_dep_type_len_minus2. If direct_dep_type_len_minus2 is equal to a first value, then video decoder 30 may, for example determine that the type of dependency of a current layer relative to a reference layer is a predetermined type without receiving instances of the direct_dependency_type syntax element. To the extent video decoder 30 needs (i.e., utilizes) a value for the "direct_dependency_type" syntax element for decoding processes, video decoder 30 may set the value for direct_dependency_type to the value corresponding to the predetermined type. If direct_dep_type_len_minus2 (i.e., the first syntax element) is equal to a second value, then video decoder 30 may, for example, determine a dependency type for a current layer relative to a reference layer by receiving an instance of the direct_dependency_type syntax element.

According to the techniques of this disclosure, the 0-th dependency_type may be made equal to (or associated with) a predetermined type of inter-layer prediction. Thus, video decoder 30 may, based on a value of zero for direct_dep_type_len_minus2, determine that the dependency type for the layers associated with the VPS is the pre-determined type. The pre-determined type may, for example, be any of (1) inter-layer sample prediction, (2) inter-layer motion prediction, or (3) a combination of inter-layer sample prediction and inter-layer motion prediction.

According to the techniques of this disclosure, the VPS extension semantics may be changed in the manner shown below. In the following description, underline is intended to show additions, and strikethrough is intended to show deletions. The changes shown below are shown relative to MV-HEVC WD5. In the examples below, the direct_dep_type_len value may indicate that one fixed prediction type is used for the whole coded video sequence. Thus, the direct_dependency_type syntax elements may not need to be present in some examples. Other signaling, as discussed above, may also be implemented so that the direct_dependency_type syntax elements are not signaled and derived to be a pre-determined value.

TABLE 3

Video parameter set extension syntax

| | Descriptor |
|---|---|
| vps_extension( ) { <br> ... <br>     direct_dep_type_len_~~minus2~~ <br>     for( i = 1; i <= vps_max_layers_minus1; i++ ) <br>       for( j = 0; j < i; j++) <br>         if( direct_dependency_flag[ i ][ j ] <br>         <u>&& direct_dep_type_len</u> ) <br>           direct_dependency_type[ i ][ j ] <br> } | ue(v) <br><br><br><br><br><br> u(v) |

In the example of TABLE 3 above, the syntax element "direct_dep_type_len_minus2" is changed to "direct_dep_type_len" signifying that the value may be equal to zero. When video decoder 30 receives, in a VPS, a value of zero for "direct_dep_type_len," video decoder 30 assigns a predetermined type of inter-layer prediction to all combinations of layers associated with the VPS. This predetermined type may, for example, be programmed into a codec or may be signaled separately. In the example of TABLE 3 above, as well as other examples below, if video decoder 30 receives the direct_dependency_type syntax element in the bitstream, then video decoder 30 receives an instance of direct_dependency_type for each layer combination, where [i] and [j] in TABLE 3 represent the various layers and [i][j]

corresponds to a layer combination. When the value for "direct_dep_type_len" is zero, the loop shown above in TABLE 3 is skipped (i.e., the instruction set of the loop is not performed) because the logical AND operation "direct_dependency_flag[i][j] && direct_dep_type_len" is false because direct_dep_type_len is false. Thus, when the loop is skipped, video decoder 30 does not receive any instances of the syntax element "direct_dependency_type[i][j]."

According to the techniques of this disclosure, video encoder 20 may encode video data in a manner that video decoder 30 may be able to avoid (i.e., refrain from and/or not be required to) decoding multiple instances of the direct_dependency_type syntax element by decoding one instance of the direct_dep_type_len syntax element, thus reducing signaling overheads. The techniques of this disclosure, however, still enable video encoder 20 to separately signal a direct_dependency_type for each layer combination when such separate signaling yields improved coding quality.

Although the syntax element "direct_dep_type_len" is shown in TABLE 3 above as a variable length syntax element with a descriptor of "ue(v)," the syntax element "direct_dep_type_len" may alternatively be signaled using fixed-length coding. For example, the descriptor for the syntax element "direct_dep_type_len" in TABLE 3 above may be changed to u(5), u(6), or any other fixed length.

Additionally, the condition of the syntax element "direct_dep_type_len" being not equal to 0 can be put in an earlier place in the VPS extension syntax, as shown in the examples of TABLE 4 and TABLE 5 below. The examples of TABLE 4 and TABLE 5 are alternative implementations semantically but are functionally equivalent. In the examples of both TABLE 4 and TABLE 5, a false value for the syntax element "direct_dep_type_len" terminates the loop used to receive the instances of "direct_dependency_type[i][j]."

TABLE 4

|  | Descriptor |
|---|---|
| vps_extension( ) {<br>...<br>   direct_dep_type_len~~_minus2~~<br>   for( i = 1; i <= vps_max_layers_minus1<br>    && direct_dep_type_len; i++<br>)<br>      for( j = 0; j < i; j++ )<br>        if( direct_dependency_flag[ i ][ j ])<br>          direct_dependency_type[ i ][ j ]<br>} | ue(v)<br><br><br><br><br><br>u(v) |

TABLE 5

|  | Descriptor |
|---|---|
| vps_extension( ) {<br>...<br>   direct_dep_type_len~~_minus2~~<br>   if( direct_dep_type_len )<br>     for( i = 1; i <= vps_max_layers_minus1; i++ )<br>       for( j = 0; j < i; j++ )<br>         if( direct_dependency_flag[ i ][ j ])<br>           direct_dependency_type[ i ][ j ]<br>} | ue(v)<br><br><br><br><br><br>u(v) |

Modifications to the descriptions of the "direct_dep_type_len_minus2" syntax element and the "direct_dependency_type[i][j]" syntax element may be implemented as follows:

direct_dep_type_len specifies the number of bits of the direct_dependency_type[i][j] syntax element. The value of direct_dep_type_len shall be in the range of 0 to 32, inclusive.

NOTE—In the MV-HEVC specification, the value of direct_dep_type_len may be required to be equal to 0. In the SHEVC specification, the value of direct_dep_type_len may be required to be equal to 2.

direct_dependency_type[i][j] indicates the type of dependency between the layer with nuh_layer_id equal layer_id_in_nuh[i] and the layer with nuh_layer_id equal to layer_id_in_nuh[j]. direct_dependency_type[i][j] equal to 0 indicates that the layer with nuh_layer_id equal to layer_id_in_nuh[j] is used for both inter-layer sample prediction and inter-layer motion prediction of the layer with nuh_layer_id equal layer_id_in_nuh[i]. direct_dependency_type[i][j] equal to 1 indicates that the layer with nuh_layer_id equal to layer_id_in_nuh[j] is used for inter-layer sample prediction but not for inter-layer motion prediction of the layer with nuh_layer_id equal layer_id_in_nuh[i]. direct_dependency_type[i][j] equal to 2 indicates that the layer with nuh_layer_id equal to layer_id_in_nuh[j] is used for inter-layer motion prediction but not for inter-layer sample prediction of the layer with nuh_layer_id equal layer_id_in_nuh[i]. Although the value of direct_dependency_type[i][j] shall be in the range of 0 to 2, inclusive, in this version of this Specification, decoders shall allow values of direct_dependency_type[i][j] in the range of 3 to $2^{32}-2$, inclusive, to appear in the syntax. When direct_dependency_flag[i][j] is 1 and direct_dependency_type[i][j] is not present, the value of direct_dependency_type[i][j] is inferred to be equal to 1.

Alternatively, the semantics of direct_dependency_type[i][j] may be changed to make the value 0 correspond to inter-layer sample prediction only case. In such an example, the semantics may be changes as follows.

direct_dependency_type[i][j] indicates the type of dependency between the layer with nuh_layer_id equal layer_id_in_nuh[i] and the layer with nuh_layer_id equal to layer_id_in_nuh[j]. direct_dependency_type[i][j] equal to 1 indicates that the layer with nuh_layer_id equal to layer_id_in_nuh[j] is used for both inter-layer sample prediction and inter-layer motion prediction of the layer with nuh_layer_id equal layer_id_in_nuh[i]. direct_dependency_type[i][j] equal to 0 indicates that the layer with nuh_layer_id equal to layer_id_in_nuh[j] is used for inter-layer sample prediction but not for inter-layer motion prediction of the layer with nuh_layer_id equal layer_id_in_nuh[i]. direct_dependency_type[i][j] equal to 2 indicates that the layer with nuh_layer_id equal to layer_id_in_nuh[j] is used for inter-layer motion prediction but not for inter-layer sample prediction of the layer with nuh_layer_id equal layer_id_in_nuh[i]. Although the value of direct_dependency_type[i][j] shall be in the range of 0 to 2, inclusive, in this version of this Specification, decoders shall allow values of direct_dependency_type[i][j] in the range of 3 to $2^{32}-2$, inclusive, to appear in the syntax. When direct_dependency_flag[i][j] is equal to 1 and direct_dependency_type[i][j] is not present, the value of direct_dependency_type[i][j] is inferred to be equal to 0.

Note that the position of the sentence start with "direct_dependency_type[i][j] equal to 1" and the sentence start with "direct_dependency_type[i][j] equal to 0" may be swapped.

In the examples above, inferring the value of "direct_dependency_type[i][j]" to be equal to 0 or 1 constitute examples of a predetermined type of inter-layer prediction.

Figure 4:
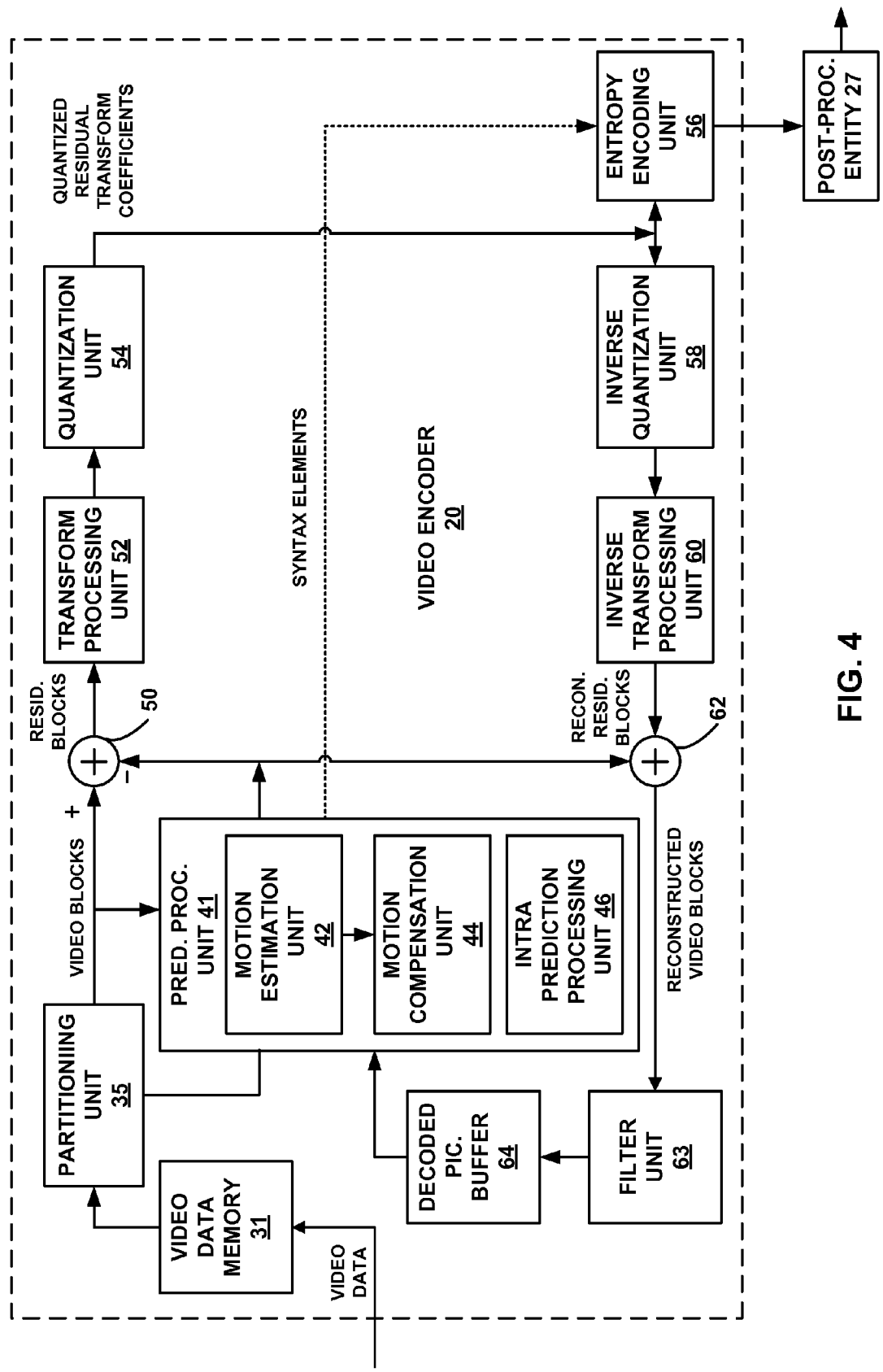
FIG. 4 is a block diagram illustrating an example video encoder that may implement the techniques described in this disclosure.

FIG. 4 is a block diagram illustrating an example video encoder 20 that may implement the techniques described in this disclosure. Video encoder 20 may, for example, be configured to generate encoded video that implements the semantics described above. In some instances, video encoder 20 may be configured to output video to post-processing entity 27. Post-processing entity 27 is intended to represent an example of a video entity, such as a MANE or splicing/editing device, that may process encoded video data from video encoder 20. In some instances, post-processing entity 27 may be an example of a network entity. In some video encoding systems, post-processing entity 27 and video encoder 20 may be parts of separate devices, while in other instances, the functionality described with respect to post-processing entity 27 may be performed by the same device that comprises video encoder 20.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 4, video encoder 20 includes video data memory 31, a partitioning unit 35, prediction processing unit 41, filter unit 63, decoded picture buffer 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, video encoder 20 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 2 as being an in loop filter, in other configurations, filter unit 63 may be implemented as a post loop filter.

Video data memory 31 may store video data to be encoded by the components of video encoder 20. The video data stored in video data memory 31 may be obtained, for example, from video source 18. Decoded picture buffer 64 may be a reference picture memory that stores reference video data for use in encoding video data by video encoder 20, e.g., in intra- or inter-coding modes. Video data memory 31 and decoded picture buffer 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 31 and decoded picture buffer 64 may be provided by the same memory device or separate memory devices. In various examples, video data memory 31 may be on-chip with other components of video encoder 20, or off-chip relative to those components.

As shown in FIG. 4, video encoder 20 receives video data at video data memory 31, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression. Motion estimation unit 42 and motion compensation unit 44 within prediction processing unit 41 may also perform inter-layer predictive coding of the current video block relative to one or more predictive blocks in one or more reference pictures of a different layer.

Motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors (e.g., temporal motion vectors and disparity motion vectors), which estimate motion for video blocks. A temporal motion vector, for example, may indicate the displacement of a PU of a video block within a current video frame or picture relative to a predictive block within a reference picture. A disparity motion vector, for example, may indicate the displacement of a PU of a video block within a current video frame or picture relative to a predictive block within a reference picture in a different layer or view.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in decoded picture buffer 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in decoded picture buffer 64. Motion estimation unit 42 sends the calculated motion vector to entropy encoding unit 56 and motion compensation unit 44. As part of determining a motion vector for coding a block of video data, motion estimation unit 42 may test various coding modes including modes that implement inter-layer sample prediction, inter-layer motion prediction, and/or a combination of inter-layer sample prediction and inter-layer motion prediction.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Some of the techniques described in this disclosure may be implemented in part by motion estimation unit 42 and motion compensation unit 44. For example, for a coded video sequence, motion estimation unit 42 may determine, based on a rate-distortion tradeoff for instance, that the coding of the coded video sequence does not benefit from the use of a certain type of inter-layer prediction (which would also include signaling a value for the dependency type syntax element). Based on that determination, motion estimation unit 42 may generate syntax elements in accordance with the techniques described above. More particularly, in response to determining not to use a certain type of inter-layer prediction for the coded video sequence, motion estimation unit 42, possibly in combination with other components of video encoder 20, may generate a value for a first syntax element representing whether a dependency type syntax element for a current layer is signaled. In response to the value for the first syntax element indicating that the dependency type syntax element is not signaled, motion estimation unit may skip generating values for the dependency type syntax element.

To reduce the number of bits required to represent the motion information of the PUs, motion estimation unit 42 may generate candidate lists for each of the PUs according to a merge mode or advanced motion vector prediction (AMVP) process. Each candidate in a candidate list for a PU may indicate motion information. The motion information indicated by some of the candidates in the candidate list may be based on the motion information of other PUs. For example, for HEVC merge mode, there may be five spatial candidate locations and one temporal candidate location. Motion estimation unit 42 may also determine one or more motion vector candidates (e.g. 3D HEVC candidates or inter-layer candidates) based on corresponding blocks in different views of layers. In some examples, motion estimation unit 42 may also generate additional candidates by combining partial motion vectors from already determined candidates, modifying candidates, or simply inserting zero motion vectors as candidates. These additional candidates are not considered to be original candidates and may be referred to as virtual candidates. For merge mode, motion estimation unit 42 generates an index for one of the candidates, and the motion information for that candidate is used to encode and decode the block. For AMVP mode, motion estimation unit 42 generates an index for one of the candidates, and the motion information for that candidate is used as a motion predictor. Thus, with AMVP mode, motion estimation unit 42 also generates motion vector difference information, and the motion vector predictor plus the motion vector difference identifies the motion vector used to encode the block.

What types of candidates motion compensation unit 44 uses to construct the candidate list may be affected by the dependency type between a current layer and a reference layer. For example, if inter-layer sample prediction is enabled, motion estimation unit 42 may include, in a candidate list, motion information that points to a block in a reference picture of a different layer (i.e., a reference layer). As another example, when inter-layer motion prediction is enabled, motion estimation unit 42 may include the motion information of a block in a different layer in a candidate list for a current block. The motion information may, for example, include a motion vector (e.g., a disparity motion vector or a temporal motion vector), and in some instances, may also include additional information, such as a reference picture index. When a combination of inter-layer sample prediction and inter-layer motion prediction is enabled, a video coder may perform both inter-layer sample prediction and inter-layer motion prediction to determine one or more candidates for a candidate list.

As explained above, the manner in which motion estimation unit 42 constructs a candidate list for merge mode or AMVP may be dependent on the type of inter-layer dependency that is enabled. For example, if only inter-layer sample prediction is enabled, then motion estimation unit 42 may be configured to not look at blocks of different layers for determining candidates. If only inter-layer motion prediction is enabled, then motion estimation unit 42 may be configured to look at blocks of different layers for determining candidates, but motion estimation unit 42 may be configured to only include the motion information of those candidates that utilize temporal motion vectors.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 (or mode select unit 40, in some examples) may select an appropriate intra-prediction mode to use from the tested modes. For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in decoded picture buffer 64. The reference block may be used by motion estimation unit 42 and motion compensation unit 44 as a reference block to inter-predict a block in a subsequent video frame or picture.

In this manner, video encoder 20 of FIG. 4 represents an example of a video encoder configured to encode multi-layer video data in accordance with the techniques of this disclosure. For coded video data comprising multiple layers, video encoder 20 may determine whether to encode the multiple layers using a single dependency type or multiple dependency types. A dependency type identifies a type of dependency of a current layer relative to a reference layer. Based on the determination of whether to encode the multiple layers using a single dependency type or multiple dependency types, video encoder 20 may determine a value for a first syntax element representing whether a dependency type syntax element for a current layer is signaled. In response to determining to encode the multiple layers using the single dependency type, video encoder 20 may skip encoding of the dependency type syntax element. The first syntax element may be included in a parameter set, and video encoder 20 may skip encoding of the dependency type syntax element by not including an instance of the dependency type syntax element in the parameter set. In response to determining to encode the multiple layers using the multiple dependency types, video encoder 20 may encode the dependency type syntax element.

The same dependency type may, for example, be any of (1) only inter-layer sample prediction, (2) only inter-layer motion prediction, or (3) a both inter-layer sample prediction and inter-layer motion prediction. In this context, having a same dependency type means all layers associated with the parameter set have the same dependency type. Thus, if video encoder 20 determines to encode the multiple layers with the same dependency type, then all of the combinations of layers will have a dependency type equal to, for example, type (1) above, or all of the combinations of layers will have a dependency type equal to type (2) above, or all of the combinations of layers will have a dependency type equal to type (3) above. If video encoder 20 determines to encode the multiple layers with multiple dependency types, then some combinations of layers may have a dependency type equal to type (1), while other combinations of layers may have a dependency type equal to type (2), and yet other combinations of layers have a dependency equal to type (3).

Figure 5:
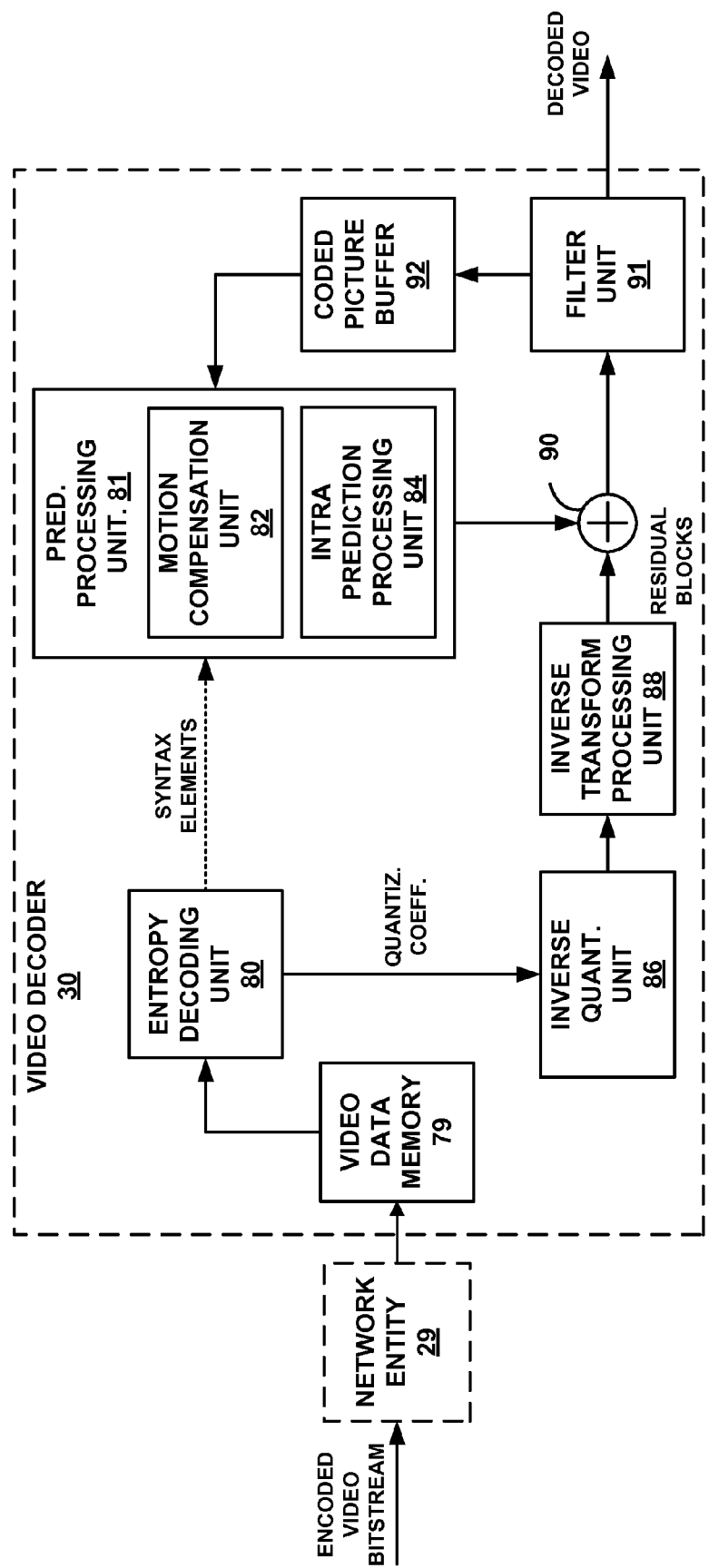
FIG. 5 is a block diagram illustrating an example video decoder that may implement the techniques described in this disclosure.

FIG. 5 is a block diagram illustrating an example video decoder 30 that may implement the techniques described in this disclosure. Video decoder 30 may, for example, be configured to decode video data that is encoded using the semantics described above. In the example of FIG. 5, video decoder 30 includes video data memory 79, an entropy decoding unit 80, prediction processing unit 81, inverse quantization unit 86, inverse transform processing unit 88, summer 90, filter unit 91, and coded picture buffer 92. Prediction processing unit 81 includes motion compensation unit 82 and intra prediction processing unit 84. Video decoder 30 may, in some examples, perform a decoding pass generally reciprocal to the encoding pass described with respect to video encoder 20 from FIG. 4.

Video data memory 79 may store video data, such as an encoded video bitstream, to be decoded by the components of video decoder 30. The video data stored in video data memory 79 may be obtained, for example, from computer-readable medium 16, e.g., from a local video source, such as a camera, via wired or wireless network communication of video data, or by accessing physical data storage media. Video data memory 79 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes. Video data memory 79 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 79 and decoded picture buffer 162 may be provided by the same memory device or separate memory devices. In various examples, video data memory 79 may be on-chip with other components of video decoder 30, or off-chip relative to those components.

During the decoding process, video decoder 30 receives an encoded video bitstream that represents video blocks of an encoded video slice and associated syntax elements from video encoder 20. Video decoder 30 may receive the encoded video bitstream from network entity 29. Network entity 29 may, for example, be a server, a MANE, a video editor/splicer, or other such device configured to implement one or more of the techniques described above. Network entity 29 may or may not include a video encoder, such as video encoder 20. Some of the techniques described in this disclosure may be implemented by network entity 29 prior to network entity 29 transmitting the encoded video bitstream to video decoder 30. In some video decoding systems, network entity 29 and video decoder 30 may be parts of separate devices, while in other instances, the functionality described with respect to network entity 29 may be performed by the same device that comprises video decoder 30.

Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in coded picture buffer 92.

Motion compensation unit 82 determines prediction information for a video block of the current video slice by parsing the motion vectors and other syntax elements and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Motion compensation unit 82 may decode the received video data using multiple inter modes, including inter-layer prediction. For example, for a video block of a current layer coded using inter-layer sample prediction, motion compensation unit 82 may use the received syntax elements to determine a disparity motion vector and use the disparity motion vector to identify, in a reference layer, a predictive block for the video block. For a video block of a current layer coded using inter-layer motion prediction, motion compensation unit 82 may use the received syntax elements to locate a reference block in a reference layer, and from the reference block, determine motion information for video block. Using the motion information, motion compensation unit 82 may identify a predictive block for the video block in a reference picture from the current layer.

As part of inter coding, motion compensation unit 82 may implement merge mode and AMVP mode in the same manner as motion estimation unit 42. Thus, motion compensation unit 82 may be configured to construct the same candidate lists as motion estimation unit 42, including applying any restrictions of candidates based on the type of inter-layer dependency enabled.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 5 as being an in loop filter, in other configurations, filter unit 91 may be implemented as a post loop filter. The decoded video blocks in a given frame or picture are then stored in coded picture buffer 92, which stores reference pictures used for subsequent motion compensation. Coded picture buffer 92 also stores decoded video for later presentation on a display device, such as display device 32 of FIG. 1.

Video decoder 30 of FIG. 5 represents an example of a video decoder configured to decode multi-layer video data in accordance with the techniques of this disclosure. As part of decoding the multi-layer video data, video decoder 30 may be configured to receive a value for a first syntax element representing whether a dependency type syntax element for a current layer is signaled. The dependency type syntax element identifies a type of dependency of a current layer relative to one or more reference layers. In response to the value for the first syntax element indicating that the dependency type syntax element is not signaled, video decoder 30 may determine that the type of dependency of the current layer relative to the reference layer is a predetermined type and decode a block of the current layer using inter-layer prediction conforming to the predetermined type.

To determine that the type of dependency of the current layer relative to the reference layer is the predetermined type, video decoder 30 may be configured to infer a value of the dependency type syntax element. To determine that the type of dependency of the current layer relative to the reference layer is the predetermined type, video decoder 30 may determine the inter-layer dependency type without decoding an instance of the dependency type syntax element for the current layer. The predetermined type may, for example, be one of (1) inter-layer sample prediction, (2) inter-layer motion prediction, or (3) a combination of inter-layer sample prediction and inter-layer motion prediction. In instances where the predetermined type is inter-layer sample prediction, video decoder 30 may decode the block of the current layer using inter-layer prediction by identifying, in the reference layer, a predictive block for the block of the current layer.

Video decoder 30 may receive the first syntax element as part of a parameter set, and in response to the value for the first syntax element indicating that the dependency type syntax element is not signaled, video decoder 30 may determine that the type of dependency of the current layer relative to all other layers associated with the parameter set is the predetermined type. Additionally, in response to the value for the first syntax element indicating that the dependency type syntax element is signaled, video decoder 30 may receive a value for the dependency type syntax element, determine the type of dependency of the current layer relative to the reference layer based on the value for the dependency type syntax element, and decode the block of the current layer using inter-layer prediction conforming to the determined type. The value for the dependency type syntax element may indicates the type of dependency of the current layer relative to the reference layer is one of (1) inter-layer sample prediction, (2) inter-layer motion prediction, or (3) a combination of inter-layer sample prediction and inter-layer motion prediction.

Figure 6:
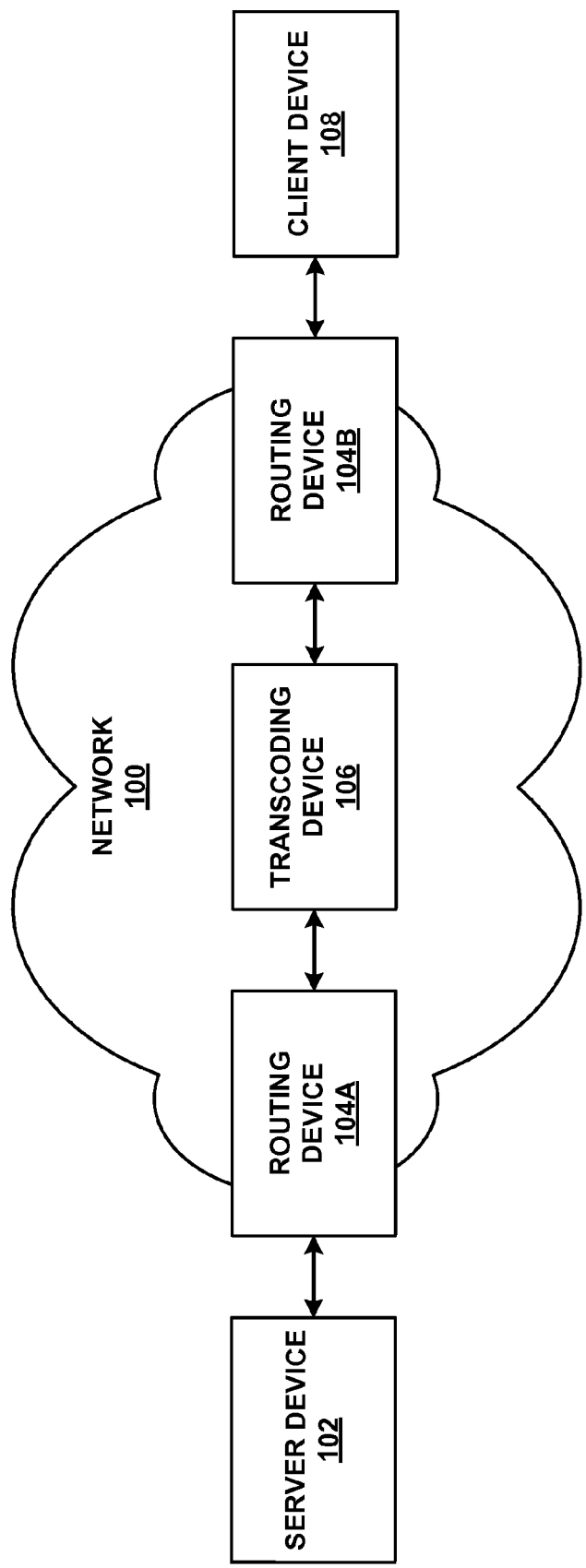
FIG. 6 is a block diagram illustrating an example set of devices that form part of a network.

FIG. 6 is a block diagram illustrating an example set of devices that form part of network 100. In this example, network 100 includes routing devices 104A, 104B (routing devices 104) and transcoding device 106. Routing devices 104 and transcoding device 106 are intended to represent a small number of devices that may form part of network 100. Other network devices, such as switches, hubs, gateways, firewalls, bridges, and other such devices may also be included within network 100. Moreover, additional network devices may be provided along a network path between server device 102 and client device 108. Server device 102 may correspond to source device 12 (FIG. 1), while client device 108 may correspond to destination device 14 (FIG. 1), in some examples.

In general, routing devices 104 implement one or more routing protocols to exchange network data through network 100. In some examples, routing devices 104 may be configured to perform proxy or cache operations. Therefore, in some examples, routing devices 104 may be referred to as proxy devices. In general, routing devices 104 execute routing protocols to discover routes through network 100. By executing such routing protocols, routing device 104B may discover a network route from itself to server device 102 via routing device 104A.

The techniques of this disclosure may be implemented by network devices such routing devices 104 and transcoding device 106, but also may be implemented by client device 108. In this manner, routing devices 104, transcoding device 106, and client device 108 represent examples of devices configured to perform the techniques of this disclosure. Moreover, the devices of FIG. 1, and encoder 20 illustrated in FIG. 4 and decoder 30 illustrated in FIG. 5 are also exemplary devices that can be configured to perform the techniques of this disclosure.

For examples, server device 102 may include a video encoder to encode a picture or pictures that are after a random access point or stream adaptation point, such as a temporal layer switching point, or other stream adaptation point. For example, this point could be a switching point for adaptation of bit rate, frame rate (i.e., temporal layer switching point), or spatial resolution Similarly, client device 108 may decode a picture or pictures that are after a random access point or stream adaptation point, such as a temporal layer switching point.

Figure 7:
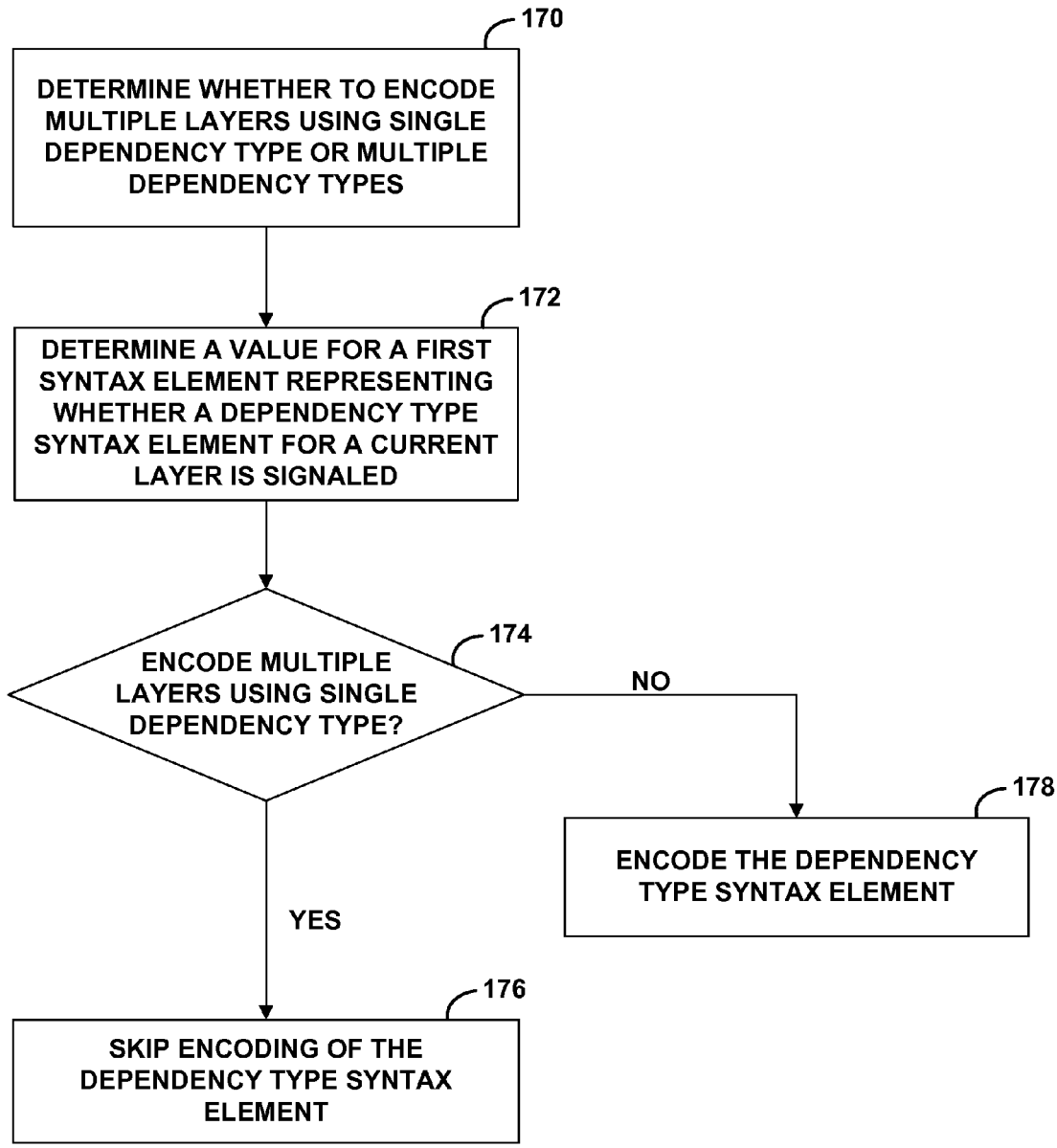
FIG. 7 is a flowchart illustrating an example method of encoding video data according to the techniques of this disclosure.

FIG. 7 is a flowchart illustrating an example method of encoding multi-layer video data according to the techniques of this disclosure. The techniques of FIG. 7 will be described with respect to video encoder 20, although the techniques of FIG. 7 are not limited to any particular type of video encoder. In the example of FIG. 7, video encoder 20 is configured to encoder multi-layer video data. For coded video data that includes multiple layers, video encoder 20 determines whether to encode the multiple layers using a same dependency type for all layers of the multiple layers or multiple dependency types (170). A dependency type identifies a type of dependency of a current layer relative to a reference layer. Based on determining whether to encode the multiple layers using the same dependency type or multiple dependency types, video encoder 20 determines a value for a first syntax element representing whether a dependency type syntax element for a current layer is signaled (172). The first syntax element may, for example, be included in a parameter set, and video encoder 20 may skip encoding of the dependency type syntax element by not including an instance of the dependency type syntax element in the parameter set. In response to determining to encode the multiple layers using the same dependency type (174, yes), video encoder 20 skips encoding of the dependency type syntax element (176). In response to determining to encode the multiple layers using the multiple dependency types (174, no), video encoder 20 encodes the dependency type syntax element (178). The same dependency type may, for example, be one of (1) inter-layer sample prediction, (2) inter-layer motion prediction, or (3) a combination of inter-layer sample prediction and inter-layer motion prediction.

Figure 8:
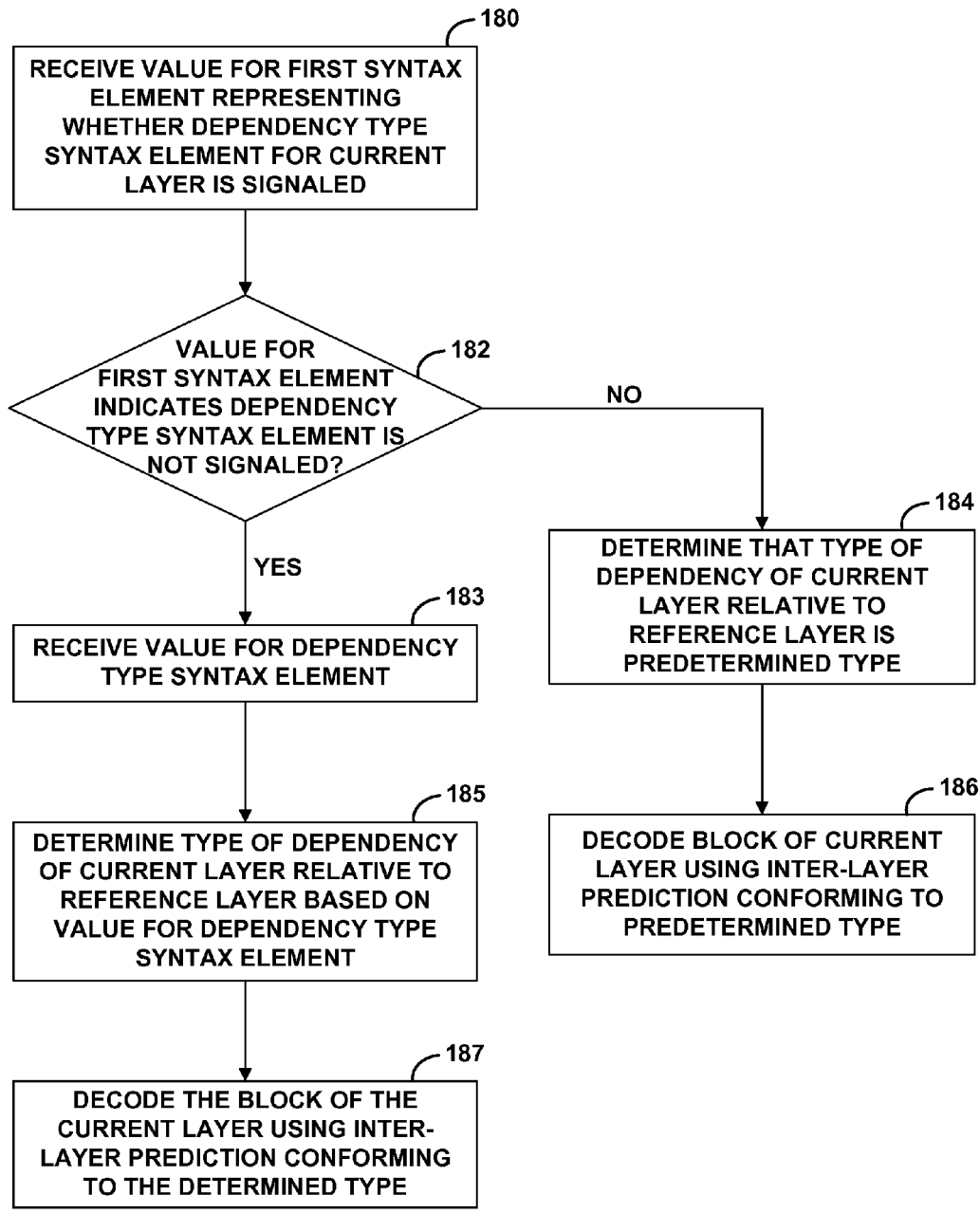
FIG. 8 is a flowchart illustrating an example method of decoding video data according to the techniques of this disclosure.

FIG. 8 is a flowchart illustrating an example method of decoding multi-layer video data according to the techniques of this disclosure. The techniques of FIG. 8 will be described with respect to video decoder 30, although the techniques of FIG. 8 are not limited to any particular type of video decoder. According to the techniques of FIG. 7, video decoder 30 may decode multi-layer video data. Video decoder 30 may receive a value for a first syntax element representing whether a dependency type syntax element for a current layer is signaled (180). The dependency type syntax element identifies a type of dependency of a current layer relative to a reference layer. In response to the value for the first syntax element indicating that the dependency type syntax element is not signaled (182, yes), video decoder 30 may determine that the type of dependency of the current layer relative to the reference layer is a predetermined type (184) and decode a block of the current layer using inter-layer prediction conforming to the predetermined type (186). In response to the value for the first syntax element indicating that the dependency type syntax element is signaled (182, no), video decoder 30 may receive a value for the dependency type syntax element (183), determine the type of dependency of the current layer relative to the reference layer based on the value for the dependency type syntax element (185), and decode the block of the current layer using inter-layer prediction conforming to the determined type (187). The value for the dependency type syntax element may indicates the type of dependency of the current layer relative to the reference layer is one of (1) inter-layer sample prediction, (2) inter-layer motion prediction, or (3) a combination of inter-layer sample prediction and inter-layer motion prediction.

Video decoder 30 may, for example, determine that the type of dependency of the current layer relative to the reference layer is the predetermined type by inferring a value of the dependency type syntax element. Alternatively or additionally, video decoder 30 may determine that the type of dependency of the current layer relative to the reference layer is the predetermined type by determining the inter-layer dependency type without decoding an instance of the dependency type syntax element for the current layer. The predetermined type may, for example, be one of (1) inter-layer sample prediction, (2) inter-layer motion prediction, or (3) a combination of inter-layer sample prediction and inter-layer motion prediction. In some examples, the predetermined type may be inter-layer sample prediction, and video decoder 30 may decode the block of the current layer using inter-layer prediction by identifying, in the reference layer, a predictive block for the block of the current layer.

Video decoder 30 may receive the first syntax element, for example, as part of a parameter set, and in response to the value for the first syntax element indicating that the dependency type syntax element is not signaled, video decoder 30 may determine that the type of dependency of the current layer relative to all other layers associated with the parameter set is the predetermined type.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding multi-layer video data, the method comprising:

receiving a first instance of a first syntax element representing whether a dependency type syntax element for a first current layer is signaled, wherein the dependency type syntax element for the first current layer identifies a type of dependency enabled for the first current layer relative to a first reference layer;

in response to a value for the first instance of the first syntax element indicating that the dependency type syntax element for the first current layer is not signaled:

determining that the type of dependency enabled for the first current layer relative to the first reference layer is a predetermined type; and decoding a block of the first current layer using inter-layer prediction conforming to the predetermined type;

receiving a second instance of the first syntax element representing whether a dependency type syntax element for a second current layer is signaled, wherein the dependency type syntax element for the second current layer identifies a type of dependency enabled for the second current layer relative to a second reference layer;

in response to a value for the second instance of the first syntax element indicating that the dependency type syntax element for the second current layer is signaled:

receiving a value for the dependency type syntax element for the second current layer;

determining the type of dependency enabled for the second current layer relative to the second reference layer based on the value for the dependency type syntax element for the second current layer; and decoding a block of the second current layer using inter-layer prediction conforming to the type of dependency enabled for the second current layer relative to the second reference layer.

2. The method of claim 1, wherein the value for the first instance of the first syntax element identifies the predetermined type.

3. The method of claim 1, wherein determining that the type of dependency enabled for the first current layer relative to the first reference layer is the predetermined type comprises determining the inter-layer dependency type without decoding an instance of the dependency type syntax element for the first current layer.

4. The method of claim 1, wherein the predetermined type comprises one of a first dependency type where the first reference layer is used for inter-layer sample prediction of the first current layer but not for inter-layer motion prediction of the first current layer, a second dependency type where the first reference layer is used for inter-layer motion prediction but not for inter-layer sample prediction of the first current layer, or a third dependency type where the first reference layer is used for both inter-layer sample prediction and inter-layer motion prediction of the first current layer.

5. The method of claim 1, wherein the predetermined type comprises inter-layer sample prediction, and wherein decoding the block of the first current layer using inter-layer prediction comprises identifying, in the first reference layer, a predictive block for the block of the first current layer.

6. The method of claim 1, further comprising:

receiving the first instance of the first syntax element as part of a parameter set;

in response to the value for the first instance of the first syntax element indicating that the dependency type syntax element for the first current layer is not signaled, determining that the type of dependency enabled for the first current layer relative to all other layers associated with the parameter set is the predetermined type.

7. The method of claim 6, wherein the parameter set comprises a video parameter set.

8. The method of claim 1, wherein the value for the dependency type syntax element for the second current layer indicates the type of dependency enabled for the second current layer relative to the second reference layer comprises one of a first dependency type where the first reference layer is used for inter-layer sample prediction of the first current layer but not for inter-layer motion prediction of the first current layer, a second dependency type where the first reference layer is used for inter-layer motion prediction but not for inter-layer sample prediction of the first current layer, or a third dependency type where the first reference layer is used for both inter-layer sample prediction and inter-layer motion prediction of the first current layer.

9. An apparatus that performs video decoding, the apparatus comprising:

a memory storing video data; and a video decoder comprising one or more processors configured to:

receive a first instance of a first syntax element representing whether a dependency type syntax element for a first current layer is signaled, wherein the dependency type syntax element for the first current layer identifies a type of dependency enabled for the first current layer relative to a first reference layer;

in response to a value for the first instance of the first syntax element indicating that the dependency type syntax element for the first current layer is not signaled:

determine that the type of dependency enabled for the first current layer relative to the first reference layer is a predetermined type; and decode a block of the first current layer using inter-layer prediction conforming to the predetermined type;

receive a second instance of the first syntax element representing whether a dependency type syntax element for a second current layer is signaled, wherein the dependency type syntax element for the second current layer identifies a type of dependency enabled for the second current layer relative to a second reference layer;

in response to a value for the second instance of the first syntax element indicating that the dependency type syntax element for the second current layer is signaled:

receive a value for the dependency type syntax element for the second current layer;

determine the type of dependency enabled for the second current layer relative to the second reference layer based on the value for the dependency type syntax element for the second current layer; and decode a block of the second current layer using inter-layer prediction conforming to the type of dependency enabled for the second current layer relative to the second reference layer.

10. The apparatus of claim 9, wherein the value for the first instance of the first syntax element identifies the predetermined type.

11. The apparatus of claim 9, wherein to determine that the type of dependency of enabled for the first current layer relative to the first reference layer is the predetermined type the one or more processors are configured to determine the inter-layer dependency type without decoding an instance of the dependency type syntax element for the first current layer.

12. The apparatus of claim 9, wherein the predetermined type comprises one of a first dependency type where the first reference layer is used for inter-layer sample prediction of the first current layer but not for inter-layer motion prediction of the first current layer, a second dependency type where the first reference layer is used for inter-layer motion prediction but not for inter-layer sample prediction of the first current layer, or a third dependency type where the first reference layer is used for both inter-layer sample prediction and inter-layer motion prediction of the first current layer.

13. The apparatus of claim 9, wherein the predetermined type comprises inter-layer sample prediction, and wherein decoding the block of the first current layer using inter-layer prediction comprises identifying, in the first reference layer, a predictive block for the block of the first current layer.

14. The apparatus of claim 9, wherein the one or more processors are further configured to:
receive the first instance of the first syntax element as part of a parameter set;
in response to the value for the first instance of the first syntax element indicating that the dependency type syntax element for the first current layer is not signaled, determine that the type of dependency enabled for the first current layer relative to all other layers associated with the parameter set is the predetermined type.

15. The apparatus of claim 9, wherein the value for the dependency type syntax element for the second current layer indicates the type of dependency enabled for the second current layer relative to the second reference layer comprises one of a first dependency type where the second reference layer is used for inter-layer sample prediction of the second current layer but not for inter-layer motion prediction of the second current layer, a second dependency type where the second reference layer is used for inter-layer motion prediction but not for inter-layer sample prediction of the second current layer, or a third dependency type where the second reference layer is used for both inter-layer sample prediction and inter-layer motion prediction of the second current layer.

16. The apparatus of claim 9, wherein the apparatus comprises at least one of:
an integrated circuit;
a microprocessor; or
a wireless communication device that includes the video decoder.

17. A non-transitory computer-readable storage medium storing instructions that when executed by one or more processors cause the one or more processors to:
receive a first instance of a first syntax element representing whether a dependency type syntax element for a first current layer is signaled, wherein the dependency type syntax element for the first current layer identifies a type of dependency enabled for the current layer relative to a first reference layer;
in response to a value for the first syntax element indicating that the dependency type syntax element for the first current layer is not signaled:
  determine that the type of dependency enabled for the first current layer relative to the first reference layer is a predetermined type; and
  decode a block of the first current layer using inter-layer prediction conforming to the predetermined type;
receive a second instance of the first syntax element representing whether a dependency type syntax element for a second current layer is signaled, wherein the dependency type syntax element for the second current layer identifies a type of dependency enabled for the second current layer relative to a second reference layer;
in response to a value for the second instance of the first syntax element indicating that the dependency type syntax element for the second current layer is signaled:
  receive a value for the dependency type syntax element for the second current layer;
  determine the type of dependency enabled for the second current layer relative to the second reference layer based on the value for the dependency type syntax element for the second current layer; and
  decode a block of the second current layer using inter-layer prediction conforming to the type of dependency enabled for the second current layer relative to the second reference layer.

18. The non-transitory computer-readable storage medium of claim 17, wherein the value for the first instance of the first syntax element identifies the predetermined type.

19. The non-transitory computer-readable storage medium of claim 17, wherein the one or more processors determine that the type of dependency enabled for the first current layer relative to the first reference layer is the predetermined type by determining the inter-layer dependency type without decoding an instance of the dependency type syntax element for the first current layer.

20. The non-transitory computer-readable storage medium of claim 17, wherein the predetermined type comprises one of a first dependency type where the first reference layer is used for inter-layer sample prediction of the first current layer but not for inter-layer motion prediction of the first current layer, a second dependency type where the first reference layer is used for inter-layer motion prediction but not for inter-layer sample prediction of the first current layer, or a third dependency type where the first reference layer is used for both inter-layer sample prediction and inter-layer motion prediction of the first current layer.

21. The non-transitory computer-readable storage medium of claim 17, wherein the predetermined type comprises inter-layer sample prediction, and wherein the computer-readable storage medium stores further instructions that when executed cause the one or more processors to:
decode the block of the first current layer using inter-layer prediction comprises identifying, in the first reference layer, a predictive block for the block of the first current layer.

22. The non-transitory computer-readable storage medium of claim 17, storing further instructions that when executed cause the one or more processors to:
receive the first instance of the first syntax element as part of a parameter set;
in response to the value for the first instance of the first syntax element indicating that the dependency type syntax element for the first current layer is not signaled, determine that the type of dependency enabled for the first current layer relative to all other layers associated with the parameter set is the predetermined type.

23. A method of encoding multi-layer video data, the method comprising:
generating a first instance of a first syntax element representing whether a dependency type syntax element for a first current layer is signaled, wherein the dependency type syntax element for the first current layer identifies a type of dependency enabled for the first current layer relative to a first reference layer, wherein a value for the first instance of the first syntax element indicates that that the dependency type syntax element for the first current layer is not signaled and that the type of dependency enabled for the first current layer relative to the first reference layer is a predetermined type; and
encoding a block of the first current layer using inter-layer prediction conforming to the predetermined type;
generating a second instance of the first syntax element representing whether a dependency type syntax element for a second current layer is signaled, wherein the dependency type syntax element for the second current layer identifies a type of dependency enabled for the second current layer relative to a second reference layer, and wherein a value for the second instance of the first syntax element indicates that the dependency type syntax element for the second current layer is signaled;

generating a value for the dependency type syntax element for the second current layer, wherein the value for the dependency type syntax element for the second current layer identifies a type of dependency enabled for the second current layer relative to the second reference layer; and encoding a block of the second current layer using inter-layer prediction conforming to the type of dependency enabled for the second current layer relative to the second reference layer.

24. The method of claim 23, wherein the value for the first instance of the first syntax element identifies the predetermined type.

25. The method of claim 23, wherein the predetermined type comprises one of a first dependency type where the first reference layer is used for inter-layer sample prediction of the first current layer but not for inter-layer motion prediction of the first current layer, a second dependency type where the first reference layer is used for inter-layer motion prediction but not for inter-layer sample prediction of the first current layer, or a third dependency type where the first reference layer is used for both inter-layer sample prediction and inter-layer motion prediction of the first current layer.

26. The method of claim 23, wherein the predetermined type comprises inter-layer sample prediction, and wherein encoding the block of the first current layer using inter-layer prediction comprises identifying, in the first reference layer, a predictive block for the block of the first current layer.

27. The method of claim 23, further comprising:
including the first instance of the first syntax element as part of a parameter set;
wherein the value for the first instance of the first syntax element indicating that the dependency type syntax element for the first current layer is not signaled and that the type of dependency enabled for the first current layer relative to all other layers associated with the parameter set is the predetermined type.

28. The method of claim 27, wherein the parameter set comprises a video parameter set.

29. The method of claim 23, wherein the value for the dependency type syntax element for the second current layer indicates the type of dependency of enabled for the second current layer relative to the second reference layer comprises one of a first dependency type where the first reference layer is used for inter-layer sample prediction of the first current layer but not for inter-layer motion prediction of the first current layer, a second dependency type where the first reference layer is used for inter-layer motion prediction but not for inter-layer sample prediction of the first current layer, or a third dependency type where the first reference layer is used for both inter-layer sample prediction and inter-layer motion prediction of the first current layer.

* * * * *